(12) United States Patent
Grass et al.

(10) Patent No.: US 9,691,089 B2
(45) Date of Patent: Jun. 27, 2017

(54) USER TO WEBSITE GUARANTEED SHOPPING

(71) Applicant: buySAFE, Inc., Arlington, VA (US)

(72) Inventors: Jeffrey Elton Grass, Arlington, VA (US); Michael John Beveridge, Bethesda, MD (US); Robert Thomas Kodey, Reston, VA (US); Shane Allen Lundy, San Jose, CA (US); Marc Morel, Silver Spring, MD (US); Kenneth Nathan Quam, Washington DC, DC (US)

(73) Assignee: buySAFE, Inc., Arlington, VA (US)

( * ) Notice: Subject to any disclaimer, the term of this patent is extended or adjusted under 35 U.S.C. 154(b) by 0 days.

(21) Appl. No.: 14/988,845

(22) Filed: Jan. 6, 2016

(65) Prior Publication Data

US 2016/0162962 A1    Jun. 9, 2016

Related U.S. Application Data

(63) Continuation of application No. 14/243,542, filed on Apr. 2, 2014, now abandoned, which is a continuation
(Continued)

(51) Int. Cl.
  *G06Q 30/00* (2012.01)
  *G06Q 30/06* (2012.01)

(52) U.S. Cl.
  CPC ................ *G06Q 30/0609* (2013.01)

(58) Field of Classification Search
  CPC ... G06Q 20/12; G06Q 20/401; G06Q 30/0601
  (Continued)

(56) References Cited

U.S. PATENT DOCUMENTS

| | | |
|---|---|---|
| 6,519,571 B1 | 2/2003 | Guheen et al. |
| 6,549,888 B1 | 4/2003 | Aieta et al. |

(Continued)

FOREIGN PATENT DOCUMENTS

| | | |
|---|---|---|
| WO | WO 02/25400 | 3/2002 |
| WO | WO 02/101507 | 12/2002 |

OTHER PUBLICATIONS

Auction Patrol "Auction Resources: Harp Auctioneers and Valuers—Independent Provincial Auction Rooms" http:www.auctionpatrol.com/Auction_Resources/more2.html; 2001-2004; 7 pages.

(Continued)

*Primary Examiner* — Brandy A Zukanovich
(74) *Attorney, Agent, or Firm* — Jason H. Vick; Sheridan Ross, PC

(57) ABSTRACT

One embodiment is directed toward a process for a merchant inspection, where a guaranteed shopping server inspects online merchants to ensure they are reliable, financially stable, and committed to providing a great online shopping experience to the buyer/user. Next, this service monitors merchants on a regular basis, to ensure they deliver on their terms of sale, thus assuring purchasers of an overall safe online experience. Next, the guaranteed shopping service provides, a guarantee for added peace of mind for the purchaser. In accordance with one embodiment, a guarantee is provided to the buyer including ID theft protection, a purchase guarantee and a lowest price guarantee. As with other type of guarantees, certain restrictions and terms may apply. If a buyer does experience a problem with an online merchant, a benefit claim can be made and once the claim is validated, guaranteed shopping coverage can apply.

20 Claims, 8 Drawing Sheets

Related U.S. Application Data of application No. 13/758,706, filed on Feb. 4, 2013, now Pat. No. 8,700,487.

(60) Provisional application No. 61/594,758, filed on Feb. 3, 2012.

(58) Field of Classification Search
USPC .................................. 705/26.1, 26.35, 27.1
See application file for complete search history.

(56) References Cited

U.S. PATENT DOCUMENTS

| | | |
|---|---|---|
| 6,839,689 B2 | 1/2005 | Aieta et al. |
| 7,228,287 B1 | 6/2007 | Samson et al. |
| 7,343,339 B2 | 3/2008 | Harrison, Jr. et al. |
| 7,644,019 B2 | 1/2010 | Woda et al. |
| 7,668,950 B2 | 2/2010 | Horowitz et al. |
| 8,515,791 B2 | 8/2013 | Woda et al. |
| 8,700,487 B2 | 4/2014 | Grass et al. |
| 8,744,917 B2 | 6/2014 | Woda et al. |
| 2001/0039524 A1 | 11/2001 | Harrison, Jr. et al. |
| 2002/0004733 A1 | 1/2002 | Addante |
| 2002/0103750 A1 | 8/2002 | Herzfeld |
| 2003/0033240 A1 | 2/2003 | Balson et al. |
| 2003/0101099 A1 | 5/2003 | Sheltz et al. |
| 2003/0130883 A1 | 7/2003 | Schroeder et al. |
| 2003/0163411 A1 | 8/2003 | Sato |
| 2003/0163704 A1 | 8/2003 | Dick et al. |
| 2004/0019908 A1 | 1/2004 | Williams et al. |
| 2004/0054784 A1 | 3/2004 | Busch et al. |
| 2004/0133471 A1 | 7/2004 | Pisaris-Henderson et al. |
| 2004/0139032 A1 | 7/2004 | Rowan |
| 2004/0204989 A1 | 10/2004 | Dicker et al. |
| 2004/0220866 A1 | 11/2004 | Marlowe-Noren |
| 2005/0060228 A1 | 3/2005 | Woo |
| 2005/0144052 A1 | 6/2005 | Harding et al. |
| 2005/0149388 A1 | 7/2005 | Scholl |
| 2005/0222906 A1 | 10/2005 | Chen |
| 2005/0268100 A1 | 12/2005 | Gasparini et al. |
| 2006/0041536 A1 | 2/2006 | Scholl et al. |
| 2006/0106665 A1 | 5/2006 | Kumar et al. |
| 2006/0190336 A1 | 8/2006 | Pisaris-Henderson et al. |
| 2007/0083761 A1 | 4/2007 | Bunter et al. |
| 2008/0103887 A1 | 5/2008 | Oldham et al. |
| 2008/0140491 A1 | 6/2008 | Jain et al. |
| 2008/0270209 A1 | 10/2008 | Mauseth et al. |
| 2009/0063303 A1 | 3/2009 | Doll |
| 2009/0307028 A1 | 12/2009 | Eldon et al. |
| 2011/0078044 A1 | 3/2011 | Gutierrez |
| 2013/0325592 A1 | 12/2013 | Woda et al. |
| 2014/0195538 A1 | 7/2014 | Downs et al. |
| 2014/0214611 A1 | 7/2014 | Grass et al. |
| 2014/0278966 A1 | 9/2014 | Woda et al. |

OTHER PUBLICATIONS

Brickley, Peg, "SuretyBond Guarantees Online Deals Get Done" Suretybond.com; LocalBusiness.com; 2000, 2 pages.

Business Wire "CorpHQ Announces E-Commerce Partnership with Contractors Bonding and Insurance Co." Mar. 26, 1999, 2 pages.

Business Wire "REPEAT/Esurance Secures $34 Million in Second Round of Financing; First Multi-State Internet Insurance Company Receives Funding from Prominent Silicon Valley Venture Capital Firms" Dec. 6, 1999, 1 page.

Business Wire "SAFECO's Innovative 'Surety Online' System Processes Bonds from Start to Finish; Utilizes Leading e-Process Technology from JetForm to Build Integrated System" Nov. 1, 2000, 2 pages.

Business Wire "Way2Bid, Inc. and Surety 2000 Corp, Announce Joint Efforts in Online Purchasing/Bonding" Nov. 30, 2000, 2 pages.

Business Wire "BuyBidWin.com Offers SatisFusion's After Support Platform on its E-Store Front" http://www.prnewswire.com; Dateline: Long Beach, Calif., May 8, 2001.

CNA Surety: Bondline; http://web.archive,org/web/19991013002312/http://cnasurety.com/; printed Nov. 18, 2004; 2 pages.

CNA Surety "Bondline: An Innovative Technology-Based Service from CNA Surety" http://www.web-archive.org/web/20000920014340/www.westernsurety.com/bondline/; printed Nov. 18, 2004; 1 page.

CNA Surety "Demos" http://www.cnasurety.com/services/demos.htm; printed Nov. 18, 2004; 2 pages.

CNA Surety "InSure Vision Technologies" http://www.cnasurety.corn/services/InSurevision.htm; printed Nov. 18, 2004, 2 pages.

DoveBid "Dovebid® Announces Seven New Transaction Support Services" http://www.dovebide.com/company/news/pr_000906_transaction.asp; Sep. 6, 2000; 4 pages.

Esuretybond.com "About Esuretybond.com"; http://esuretybond.com/about_esuretybond.htm; printed Jul. 2, 2003.

Fitzgerald, John B., et al. "Principles of Suretyship" vol. II; Insurance Institute of America; First Edition 1991, pp. 103-104.

Gassen, Timothy "Robby the Robot Would Marvel at How He is Sold" Arizona Daily Star, Tucson, Arizona, Feb. 22, 1999, p. 7E; 3 pages.

Get Coverage "Application for WebTradeInsure Insurance" http://web.archive.org/web/20000619212149/www.webtradeinsure.com/ . . . ; printed Feb. 10, 2005; 3 pages.

Great American Insurance's Electronic Surety: Online Notary Bonds; www.electronicsurety.com/Electronicsurety/default.asp; printed Jul. 2, 2003.

Hix, Nancy L. "Before the Auction: Understanding Insurance" AW Daily—Tips & Tactics; http://www.vendio.com/service/tipsandtactics/buy-insurance.html; 1998-2005; 3 pages.

HTFD Financial Services Group Inc., "Its All About Time: Selling Fidelity and Surety Bonds is About to Get a Lot Faster for Agents" Agent Magazine, Jan./Feb. 1999, 2 pages.

HTFD Financial Services Group Inc. "New Bond System Goes One Step Beyond" Agent Magazine, Jan./Feb. 1999, 1 page.

Insurance Journal—National News "Esurety Launches Agent Web Site" http://www.insurancejournal.com/new/national/2000/07/18/11203.htm; Jul. 18, 2000, 2 pages.

Insurance Journal—National News "E-Surety.net Unveils Surety Bond Site" May 11, 2000; http://www.insurancejournal.com/news/national/2000/05/11/11012.htm; 2 pages.

Insurance Journal—West News "Calif. Company Offers Coverage for Online Auction Purchases" http://www.insurancejournal.com/news/west/2000/07/28/12068.htm; Jul. 28, 2000; 1 page.

InSure Vision "About IVT—Corporate Overview" http://www.insurevision.com/corpprofile.htm; 1999-2000, 1 page.

InSure Vision "InSure Vision Technologies, LLC Announces Alliance with CNA Surety" http://www.insurevision.com/PressRelease/prcna10-29-1999.htm; Oct. 28, 1999. 1 page.

InSure Vision "InSure Vision Technologies, LLC Announces the Opening of East Coast Office" http://www.insurevision.com/pressrelease/prbaltoffc01-05-2000.htm; Jan. 5, 2000, 1 page.

InSure Vision "InSure Vision Technologies, LLC Releases SurePath 1.3" Jul. 5, 2000, 1 page.

InSure Vision "Insure Vision Technologies, LLC Welcomes Aboard Thomas Rutherfoord, Inc." http://www.insurevision.com/PressRelease/prRutherfoord12-19-99.htm; Dec. 19, 1999, 1 page.

InSure Vision "News Archive" http://www.insurevision.com/newsArchive.htm; Oct. 28, 1999-Nov. 27, 2000, 1 page.

InSure Vision "SurePath—Demo—FAQs" http://web.archive.org/web/200001017011200/www.insurevision.com/faq.htm; Feb. 9, 2005; 3 pages.

InSure Vision "SurePath—Demo—Products" http://web.archive.org/web/200001204160000/insurevision.com/products2/htm; Feb. 9, 2005, 1 pages.

InSure Vision "SurePath—Surety Bond Processing" http://web.archive.org/web/20000302194816/insurevision.com/corpprofi . . . ; Feb. 9, 2005, 1 page.

InSure Vision, "Welcome to IVT" http://www.insurevision.com; Sep. 15, 2003, 1 page.

InSure Vision, "What's New" News Archive, http://www.insurevision.com.news.htm; Feb. 12, 2001-Sep. 15, 2003, 1 page.

(56) References Cited

OTHER PUBLICATIONS

InSure Vision, "What's New" News Release, Oct. 28, 1999-Mar. 20, 2000; http://web.archive.org/web/20000601130439/insurevision.com/news.htm; 1 page.
InSure Vision Technologies Presents "SurePath and SureForm 'The Bonding of Tradition and Technology'" http://web.archive.org/web/2000030218434/http://insurevision.com/; printed Feb. 9, 2005; 2 pages.
Internet Archive Wayback Machine, 2001, 5 pages.
Internet Archive Wayback Machine, http://webtradeinsure.com; 2001, 1 page.
Loebbecke, Claudia et al. "Increasing Trust in e-Commerce: Concepts and Examples of Insurance Solutions" Department of Media Management, University of Cologne, 14th Bled Electronic Commerce Conference, Bled, Solvenia, Jun. 25-26, 2001, pp. 1-18.
Look Smart—Find Articles, "Marsh Debuts Online Guarantee Program" www.findarticles.com/p/articles/mi_mOBJK/is_14_11/ai_67315633; Nov. 9, 2004, 2 pages.
Marrison, Chris "Risk Measurement for Project Finance Guarantees" Journal of Project Finance, New York, Summer 2001, vol. 7, Iss. 2, pp. 43-54.
Mittleman, Kelly "Online Insurance: Auction Sites Still Hesitate to Provide Services for Wary Consumers" Antiques and the Arts Online; http://www.antiquesandthearts.com/AnatomyLession.asp?d=Archive20 . . . ; Feb. 11, 2005, 2 pages.
Purchasing.Com "Net Services" http://www.purchasing.com/article/CA139426.html; Aug. 24, 2000; 2 pages.
Rothke, Ben "On the Cutting Edge: Alice Doesn't Sign Here Anymore" Information Security Magazine; http://infosecuritymag.techtarget.com/articles/august00/departments3_n . . . ; Aug. 2000, 8 pages.
Simplebound Insurance Services, "Online Surety Bond Applications"; http://www.simplebond.com; Printed Jun. 12, 2003; 3 pages.
South Coast Surety Insurance Services Inc.; http://southcoastsurety.com; printed Jul. 2, 2003.
Steiner, Ina "This & That; 1) Online Auction Insurance" This & That; Dec. 3, 2000, 2 pages.
suretybond.com; 2000, 1 page.
Suretybond.com; "How Does Suretybond.com Benefit Exchanges" 2000, 2 pages.
The Bond Agency.com; http://thebondafency.com/; printed Jul. 2, 2003.
The Hartford Group, Inc., "New Bond System Goes One Step Beyond" Jan. 2001, 4 pages.
Tradesafe.com "Being a Seller—Being a Buyer" 1999-2000, 4 pages.
Tradesafe.com "Buyer's Guide" 1999-2000, 1 page.
Tradesafe.com "Commercial Surety" Jan./Feb. 1999, 1 page.
Tradesafe.com; "The Company: Tradesale.com—Empowering Sellers and Protecting Buyers"; tradesafe.com; 1999-2000; 3 pages.
Tradesafe.com "Frequently Asked Questions: What is 1StepSurety?" Jan./Feb. 1999, 3 pages.
Tradesafe.com "Internet Archive WayBackMachine" 2001, 1 page.
Tradesafe.com "Tradesafe.com™ Chosen by AuctionWatch.com to Provide Guaranteed Payment Service for Online Buyers and Sellers" New Release, Jul. 25, 2000, 2 pages.
Tradesafe.com "Tradesafe.com™ Chosen by Lycos to Provide Online Escrow Service" News Release, Oct. 1, 1999, 2 pages.
Tradesafe.com "TradeSafe Online Corporation" 1995-1999; 1 page.
Tradesafe.com "Opoly Enterprises Teams with Tradesafe.com™ to Protect Users Against Online Frauds" New Release, Apr. 25, 2000, 2 pages.
Tradesafe.com "Tradesafe.com™ Partners with Online Auction Site boxLot.com for On-Line Payment Service" New Release, Dec. 17, 1999, 2 pages.
Tradesafe.com "The Tradesafe Payments Guarantee" 1999-2000, 2 pages.
Tradesafe.com "Tradesafe.com™ Receives $10 Million in Venture Funding from Germany's IQ Capital" New Release, Mar. 13, 2000, 2 pages.

Tradesafe.com "Sellers" Guide, 1999-2000, 2 pages.
Tradesafe.com "Transactions over $1200" 1999-2000, 2 pages.
Tradesafe.com "Welcome to Tradesafe Payments!" 1999-2000, 2 pages.
Tradesafe.com "What is 1StepSurety?—Systems Requirements/Frequently Asked Questions" Jan./Feb. 1999, 1 page.
Tradesafe.com "Why are we Special" Jan./Feb. 1999, 1 page.
Trebilcock, Bob "Don't Get Scammed on the Internet" Good Housekeeping, Sep. 1998, v. 227.3, p. 161-162.
"Trusted Shops—How It Works" http://web.archive.org/web/20010622085640/http://www.trustedshops.com/en/consumers/hot_it_works_en.html, printed Mar. 15, 2012.
Web Trade Insure "About WebTradeInsure" http://web.archive.org/web/20000407174703/http://www.webtradeinsure . . . ; printed Feb. 10, 2005, 1 page.
Web Trade Insure "Auction Sites" http://web.archive.org/web/20010208094919/www.webtradeinsure.com./ . . . , printed Feb. 10, 2005; 1 page.
Web Trade Insure "Frequently Asked Questions" http://web.archive.org/web/200001102115648/www.webtradeiunsure.com/ . . . ; printed Feb. 10, 2005, 1 page.
Web Trade Insure "Sellers" http://web.archive.org/web/20010208104347/www.webtradeinsure.com/ . . . ; printed Feb. 10, 2005; 2 pages.
Western Surety Company: BondLine; http://web.archive.org/web/19980713094857/westernsurety.com/bondline/bondline_body.htm; printed Nov. 18, 20014; 2 pages.
WLI BuyerAssurance.com "Online Incentives Boost Revenue, Turning e-Commerce Browsers into Loyal Customers-Customized, Branded Instant Rewards Differentiate Online Merchant's Web Site with Best Price Guarantees, Extended . . . " Business Wire Wednesday, Oct. 1, 2003.
International Search Report for International Application No. PCT/US2004/010109, mailed Feb. 5, 2007.
Written Opinion for International Application No. PCT/US2004/010109, mailed Feb. 5, 2007.
International Preliminary Report on Patentability for International Application No. PCT/US2004/010109, mailed Feb. 20, 2007.
European Search Report for European Patent Application No. 04759790.1, mailed Jun. 6, 2012.
Official Action for European Patent Application No. 04759790.1, mailed Sep. 25, 2012.
Summons to Attend Oral Proceedings for European Patent Application No. 04759790.1, mailed Nov. 18, 2014.
International Search Report for International Application No. PCT/US2013/024632, mailed Apr. 19, 2013.
Written Opinion for International Application No. PCT/US2013/024632, mailed Apr. 19, 2013.
International Preliminary Report on Patentability for International Application No. PCT/US2013/024632, mailed Aug. 14, 2014.
Official Action (Restriction Requirement) for U.S. Appl. No. 10/419,269, mailed Apr. 7, 2008.
Official Action for U.S. Appl. No. 10/419,269, mailed Mar. 5, 2009.
Official Action for U.S. Appl. No. 10/419,269, mailed Jul. 20, 2009.
Notice of Allowance for U.S. Appl. No. 10/419,269, mailed Oct. 30, 2009.
Official Action for U.S. Appl. No. 12/263,740, mailed Mar. 1, 2011.
Official Action for U.S. Appl. No. 12/263,740, mailed Jul. 22, 2011.
Official Action for U.S. Appl. No. 12/263,740, mailed Sep. 27, 2013.
Official Action for U.S. Appl. No. 12/263,740, mailed Jan. 31, 2014.
Notice of Allowance for U.S. Appl. No. 12/263,740, mailed Mar. 10, 2014.
Official Action for U.S. Appl. No. 12/263,778, mailed Aug, 23, 2011.
Official Action for U.S. Appl. No. 12/263,778, mailed Mar. 1, 2012.
Notice of Allowance for U.S. Appl. No. 12/263,778 mailed May 30, 2013.
Office Action for U.S. Appl. No. 14/191,806 mailed Jul. 18, 2014.
Office Action for U.S. Appl. No. 14/191,806 mailed May 22, 2015.
Official Action for U.S. Appl. No. 13/758,706, mailed Jun. 21, 2013.
Notice of Allowance for U.S. Appl. No. 13/758,706, mailed Dec. 6, 2013.

(56) References Cited

OTHER PUBLICATIONS

Office Action or U.S. Appl. No. 14/243,542, mailed Jun. 12, 2014.
Office Action for U.S. Appl. No. 14/243,542, mailed Dec. 23, 2014.
Office Action for U.S. Appl. No. 14/243,542, mailed Jul. 7, 2015.
Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (84 pages).
Exhibit 1001 (U.S. Pat. No. 8,515,791) for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (17 pages).
Exhibit 1002—*SAP America, Inc. v. Versata Development Group, Inc.*, CBM 2012-00001, Paper No. 36, Decision Institution of Covered Business Method Review (Jan. 9, 2013) for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (44 pages).
Exhibit 1003—Congressional Record—Senate, "Patent Reform Act of 2011," 157 Cong. Rec. S1360-1394 (daily edition, Mar. 8, 2011) for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (35 pages).
Exhibit 1004—*Volusion, Inc. v. Versata Software, Inc. and Versata Development Group, Inc.*, CBM 2013-00017, Paper No. 8, Decision Institution of Covered Business Method Review (Oct. 24, 2013) for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (18 pages).
Exhibit 1005—77 Fed. Reg. 157 (Aug. 14, 2012) 48734-48773 for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (21 pages).
Exhibit 1006—Classification Definitions, Class 705, Data Processing: Financial, Business Practice, Management, or Cost/Price Determination. Jan. 2012 for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (53 pages).
Exhibit 1007—Prosecution History for U.S. Appl. No. 12/263,778 for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Method Review No. CBM2014-00122, filed May 9, 2014 (276 pages).
Exhibit 1008—Complaint for Patent Infringement, *buySAFE, Inc. v. Google Inc.*, Civil Action No. 3:13-cv-00781-HEH (E.D. Va.) for Google Inc.'s Petition for Covered Business Method Review Under 35 U.S.C. § 321 and § 18 of the Leahy-Smith America Invents Act, *Google Inc. v. buySAFE, Inc.* United States Patent and Trademark Office—Before the Patent Trial and Appeal Board, Covered Business Method Review No. CBM2014-00122, filed May 9, 2014 (8 pages).
Exhibit 1009—"Plaintiff buySAFE's Opening Claim Construction Brief", Document 39 from *buySAFE, Inc. v. Google Inc.*, Civil Action No. 1:11-cv-01282-LPS (D. Del., Aug. 10, 2012) for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (22 pages).
Exhibit 1010—U.S. Pat. No. 7,644,019 (the "'019 patent") for Google Inc.'s Petition for Covered Business Method Review Under 35 U.S.C, § 321 and § 18 of the Leahy-Smith America Invents Act, *Google Inc. v. buySAFE, Inc.* United States Patent and Trademark Office—Before the Patent Trial and Appeal Board, Covered Business Method Review No. CBM2014-00122, filed May 9, 2014 (35 pages).
Exhibit 1011—U.S. Patent Publication No. 2004/0210527 ("Woda") for Google Inc.'s Petition for Covered Business Method Review Under 35 U.S.C, § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (40 pages).
Exhibit 1012—U.S. Pat. No. 7,228,287 ("Samson") for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (12 pages).
Exhibit 1013—U.S. Patent Publication No. 2008/0103887 ("Oldham") for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (13 pages).
Exhibit 1014—U.S. Patent Publication No. 2003/0130883 ("Schroeder") for Google Inc.'s Petition for Covered Business Method Review Under 35 U.S.C. § 321 and § 18 of the Leahy-Smith America Invents Act, *Google Inc. v. buySAFE, Inc.*, United States Patent and Trademark Office—Before the Patent Trial and Appeal Board, Covered Business Method Review No. CBM2014-00122, filed May 9, 2014 (20 pages).
Exhibit 1015—Declaration of Dr. Edward J. Cherian Concerning the Invalidity of U.S. Pat. No. 8,515,791 for Google Inc.'s Petition for Covered Business Method Review Under 35 U.S.C. § 321 and § 18 of the Leahy-Smith America Invents Act, *Google Inc, v. buySAFE, Inc.*, United States Patent and Trademark Office—Before the Patent Trial and Appeal Board, Covered Business Method Review No. CBM2014-00122, filed May 9, 2014 (46 pages).
Petitioner's Power of Attorney in a Covered Business Method Review Before the Patent Trial and Appeal Board, *Google Inc. v. buySAFE, Inc.*, United States Patent and Trademark Office—Before the Patent Trial and Appeal Board, Covered Business Method Review No. CBM2014-00122, dated May 6, 2014 (1 page).
Notice of Filing Date Accorded to Petition and Time for Filing Patent Owener Preliminary Response, *Google Inc. v. buySAFE, Inc.*, United States Patent and Trademark Office—Before the Patent Trial and Appeal Board, Covered Business Method Review No. CBM2014-00122, dated May 15, 2014 (3 pages).
Patent Owner's Mandatory Notices and Power of Attorney, *Google Inc. v. buySAFE, Inc.*, United States Patent and Trademark Office—Before the Patent Trial and Appeal Board, Covered Business Method Review No. CBM2014-00122, dated May 30, 2014 (7 pages).
Patent Owner's Preliminary Response—Redacted, (Including Redacted Exhibits 2001 and 2002) and *Google Inc. v. buySAFE, Inc.*, United States Patent and Trademark Office—Before the Patent

(56) References Cited

OTHER PUBLICATIONS

Trial and Appeal Board, Covered Business Method Review No. CBM2014-00122, dated Aug. 11, 2014 (83 pages).
Patent Owner's Motion to Seal, *Google Inc.* v. *buySAFE, Inc.*, United States Patent and Trademark Office—Before the Patent Trial and Appeal Board, Covered Business Method Review No. CBM2014-00122, dated Aug. 20, 2014 (4 pages).
Order—Conduct of Proceeding, *Google Inc.* v. *buySAFE, Inc.*, United States Patent and Trademark Office—Before the Patent Trial and Appeal Board, Covered Business Method Review No. CBM2014-00122, dated Sep. 19, 2014 (3 pages).
Google Inc. and buySAFE, Inc.'s Joint Request to Seal Settlement Agreement and File as Business Confidential Information Under 35 U.S.C. § 327, *Google Inc.* v. *buySAFE, Inc.*, United States Patent and Trademark Office—Before the Patent Trial and Appeal Board, Covered Business Method Review No. CBM2014-00122, dated Sep. 22, 2014 (3 pages).
Google Inc. and buySAFE, Inc.'s Joint Motion to Terminate Proceeding Pursuant to 35 U.S.C. § 327, *Google Inc.* v. *buySAFE, Inc.*, United States Patent and Trademark Office—Before the Patent Trial and Appeal Board, Covered Business Method Review No. CBM2014-00122, dated Sep. 22, 2014 (4 pages).
Decision—Termination of the Proceeding, *Google Inc.* v. *buySAFE, Inc.*, United States Patent and Trademark Office—Before the Patent Trial and Appeal Board, Covered Business Method Review No. CBM2014-00122, dated Sep. 29, 2014 (5 pages).
Petitioner's Request of Post-Institution Fees, *Google Inc.* v. *buySAFE, Inc.*, United States Patent and Trademark Office—Before the Patent Trial and Appeal Board, Covered Business Method Review No. CBM2014-00122, dated Oct. 7, 2014 (3 pages).
Notice of Refund, *Google Inc.* v. *buySAFE, Inc.*, United States Patent and Trademark Office—Before the Patent Trial and Appeal Board, Covered Business Method Review No. CBM2014-00122, dated Oct. 8, 2014 (2 pages).
Plaintiff's Complaint for Patent Infringement (U.S. Pat. No. 7,644,019), *buySAFE, Inc.* vs. *Google Inc.*, U.S. District Court for the District of Delaware, Civil Action No. 1:11-cv-01282-UNA, filed Dec. 22, 2011, 45 pages.
Google Inc.'s Disclosures Pursuant to Paragraph 3 of the Default Standard for Discovery Including Discovery of Electronically Stored Information ("ESI"), *buySAFE, Inc.*, vs. *Google Inc.*, U.S. District Court, for the District of Delaware, Civil Action No. 11-1282-LPS, filed May 16, 2012, 4 pages.
Google Inc.'s Initial Disclosures Pursuant to Federal Rule of Civil Procedure 26(A)(1), *buySAFE, Inc.* vs. *Google, Inc.* U.S. District Court, for the District of Delaware, Civil Action No. 11-1282-LPS, filed May 16, 2012, 6 pages.
Google Inc.'s Notice of Service, *buySAFE, Inc.*, vs. *Google Inc.*, U.S. District Court, for the District of Delaware, Civil Action No. 11-1282-LPS, filed Jun. 22, 2012, 3 pages.
Google Inc.'s Objections and Responses to Plaintiff buySAFE, Inc.'S First Set of Interrogatories (Nos. 1-8) *buySAFE, Inc.*, vs. *Google Inc.*, U.S. District Court, for the District of Delaware, Civil Action No. 11-1282-LPS, filed Jun. 22, 2012, 8 pages.
Google Inc.'s Objections and Responses to Plaintiff buySAFE, Inc.'S First Requests for Production, *buySAFE, Inc.*, vs. *Google Inc.*, U.S, District Court, for the District of Delaware, Civil Action No. 11-1282-LPS, filed Jun. 22, 2012, 38 pages.
buySAFE, Inc.'S Initial Disclosures, *buySAFE, Inc.*, vs. *Google Inc.*, U.S. District Court, for the District of Delaware, Civil Action No. 11-1282-LPS, filed May 16, 2012, 9 pages.
Letter From P. Gupta to Google Counsel J. Mancini Re Google's Affirmative Defenses, *buySAFE, Inc.*, vs. *Google Inc.*, U.S. District Court, for the District of Delaware, Civil Action No. 11-1282-LPS, dated Mar. 2, 2012, 2 pages.
Stipulation and [Proposed] Order Extending Fact Discovery Deadline, *buySAFE, Inc.*, vs. *Google Inc.*, U.S. District Court, for the District of Delaware, Civil Action No. 11-1282-LPS, filed Mar. 27, 2013, 1 page.

Plaintiff buySAFE, Inc.'S Brief in Opposition to Defendant Google Inc.'s Opening Claim Construction Brief, *buySAFE, Inc.*, vs. *Google Inc.*, U.S. District Court, for the District of Delaware, Civil Action No. 11-1282-LPS, dated Sep. 7, 2012, 21 pages.
buySAFE, Inc.'S Claim Construction Hearing Brief, 30 pages.
Plaintiff buySAFE's Opening Claim Construction Brief, *buySAFE, Inc.*, vs. *Google Inc.*, U.S. District Court, for the District of Delaware, Civil Action No. 11-1282-LPS, dated Aug. 10, 2012, 22 pages.
Google Inc.'s Identification of Terms, Phrases, and Clauses for Early Claim Construction, *buySAFE, Inc.*, vs. *Google Inc.*, U.S. District Court, for the District of Delaware, Civil Action No. 11-1282-LPS, dated Jul. 2, 2012, 3 pages.
Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 25 pages.
Exhibit 1 (U.S. Pat. No. 7,644,019) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 36 pages.
Exhibit 2 (Prosecution History for the '019 Patent) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 85 pages.
Exhibit 3 (A Dictionary of Model Legal Usage, Bryan Garner Ed, (2D Ed. Oxford University Press 1995)) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 4 pages.
Exhibit 4 (Eric T. Laity, "The United States' Response to Tax Havens: The Foreign Base Company Services Income of Controlled Foreign Corporations," 18 Nw. J. Int'l L. & Bus. 1, 7 and 16 (1997-1998)) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 49 pages.
Exhibit 5 (Collins English Dictionary (Harpercollins 2009)) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 5 pages.
Exhibit 6 (Encyclopedia Britannica 2008) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 2 pages.
Exhibit 7 (Black's Law Dictionary, 6th Ed., West Group 1990) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 12 pages.
Exhibit 8 (dictionary.com Based on Random House Dictionary) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 2 pages.
Exhibit 9 (Black's Law Dictionary, 2nd Pocket Ed., Bryan Garner, Ed., (West Group 2001)) to Defendant Google's Opening Claim Construction Brief, *buySAFE, Inc.*, vs. *Google Inc.*, U.S. District Court, for the District of Delaware, Civil Action No. 11-1282-LPS, dated Aug. 10, 2012, 6 pages.
Defendant Google's Answering Claim Construction Brief, *buySAFE, Inc.*, vs. *Google Inc.*, U.S. District Court, for the District of Delaware, Civil Action No. 11-1282-LPS, dated Sep. 7, 2012, 15 pages.
Judgment in a Civil Case—In Favor or Defendant, *buySAFE, Inc.*, vs. *Google Inc.*, U.S. District Court, for the District of Delaware, Civil Action No. 11-1282-LPS, dated Aug. 19, 2013, 1 page.
Defendant Google's Opening Brief in Support of Its Motion for Judgment on the Pleadings, *buySAFE, Inc.*, vs. *Google Inc.*, U.S. District Court, for the District of Delaware, Civil Action No. 11-1282-LPS, dated Jul. 9, 2012, 23 pages.

(56) References Cited

OTHER PUBLICATIONS

Defendant Google's Reply Brief in Support of Its Motion for Judgment on the Pleadings, *buySAFE, Inc.*, vs. *Google Inc.*, U.S. District Court, for the District of Delaware, Civil Action No. 11-1282-LPS, dated Aug. 31, 2012, 13 pages.
Plaintiff buySAFE, Inc.'S Opposition to Google, Inc.'s Motion for Judgment on the Pleadings, *buySAFE, Inc.*, vs. *Google Inc.*, U.S. District Court, for the District of Delaware, Civil Action No. 11-1282-LPS, dated Aug. 10, 2012, 21 pages.
buySAFE, Inc.'s Presentation at Oct. 26, 2012 Hearing, *buySAFE, Inc.*, vs. *Google Inc.*, U.S. District Court, for the District of Delaware, Civil Action No. 11-1282-LPS, 16 pages.
buySAFE, Inc.'s Tutorial at 101 & Markman Hearing, *buySAFE, Inc.*, vs. *Google Inc.*, U.S. District Court, for the District of Delaware, Civil Action No. 11-1282-LPS, 17 pages.
Brief for Plaintiff-Appellant buySAFE, Inc., *buySAFE, Inc.*, vs. *Google Inc.*, U.S. District Court, for the District of Delaware, Civil Action No. 11-1282-LPS, dated Oct. 21, 2013, 88 pages.
Brief for Defendant—Appallee Google, Inc., *buySAFE, Inc.*, vs. *Google Inc.*, U.S. District Court, for the District of Delaware, Civil Action No. 11-1282-LPS, dated Dec. 5, 2013, 66 pages.
Reply Brief for Plaintiff-Appellant buySAFE, *buySAFE, Inc.*, vs. *Google Inc.*, U.S. District Court, for the District of Delaware, Civil Action No. 11-1282-LPS, dated Dec. 23, 2013, 30 pages.
Plaintiff's Complaint for Patent Infringement (U.S. Pat. No. 8,515,791) *buySAFE, Inc.* vs. *Google Inc.*, U.S. District Court, for the Eastern District of Virginia—Richmond Division, Civil Action No. 3:13-cv-00781-HEH, filed Nov. 25, 2013, 8 pages.
Defendant Google Inc.'s Answer to Complaint, *buySAFE, Inc.*, vs. *Google Inc.*, U.S. District Court, for the Eastern District of Virginia (Richmond Division), Civil Action No. 3:13-cv-00781-HEH, filed Jan. 27, 2014, 14 pages.
Google Inc.'s Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Jan. 27, 2014, 4 pages.
Google Inc.'s Memorandum in Support of Its Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Jan. 27, 2014, 18 pages.
buySAFE, Inc.'s Memorandum in Opposition to Google's Motion to Transfer Venue Pursuant to 28 U.S.C. § 140(a), *buySAFE, Inc.* vs. *Google Inc.*, U.S. District Court, for the Eastern District of Virginia (Richmond Division), Civil Action No. 3:13-cv-781-HEH, filed Feb. 10, 2014, 19 pages.
Declaration of Jeffrey E. Grass in Support of buySAFE's Opposition to Google's Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Feb. 10, 2014, 2 pages.
Google Inc.'s Reply in Support of Its Motion to Transfer Venue Pursuant to 28 U.S.C. § 1404(a), *buySAFE, Inc.* vs. *Google Inc.*, U.S. District Court, for the Eastern District of Virginia (Richmond Division), Civil Action No. 3:13-cv-781-HEH, filed Feb. 13, 2014, 130 pages.
Executed Memorandum Order—Denying Google Inc.'s Motion to Transfer Venue, *buySAFE, Inc.* vs. *Google Inc.*, U.S. District Court, for the Eastern District of Virginia (Richmond Division), Civil Action No. 3:13-cv-781-HEH, filed Feb. 14, 2014, 3 pages.
Official Action for U.S. Appl. No. 14/289,326, mailed Jul. 15, 2016.

FIG. 6

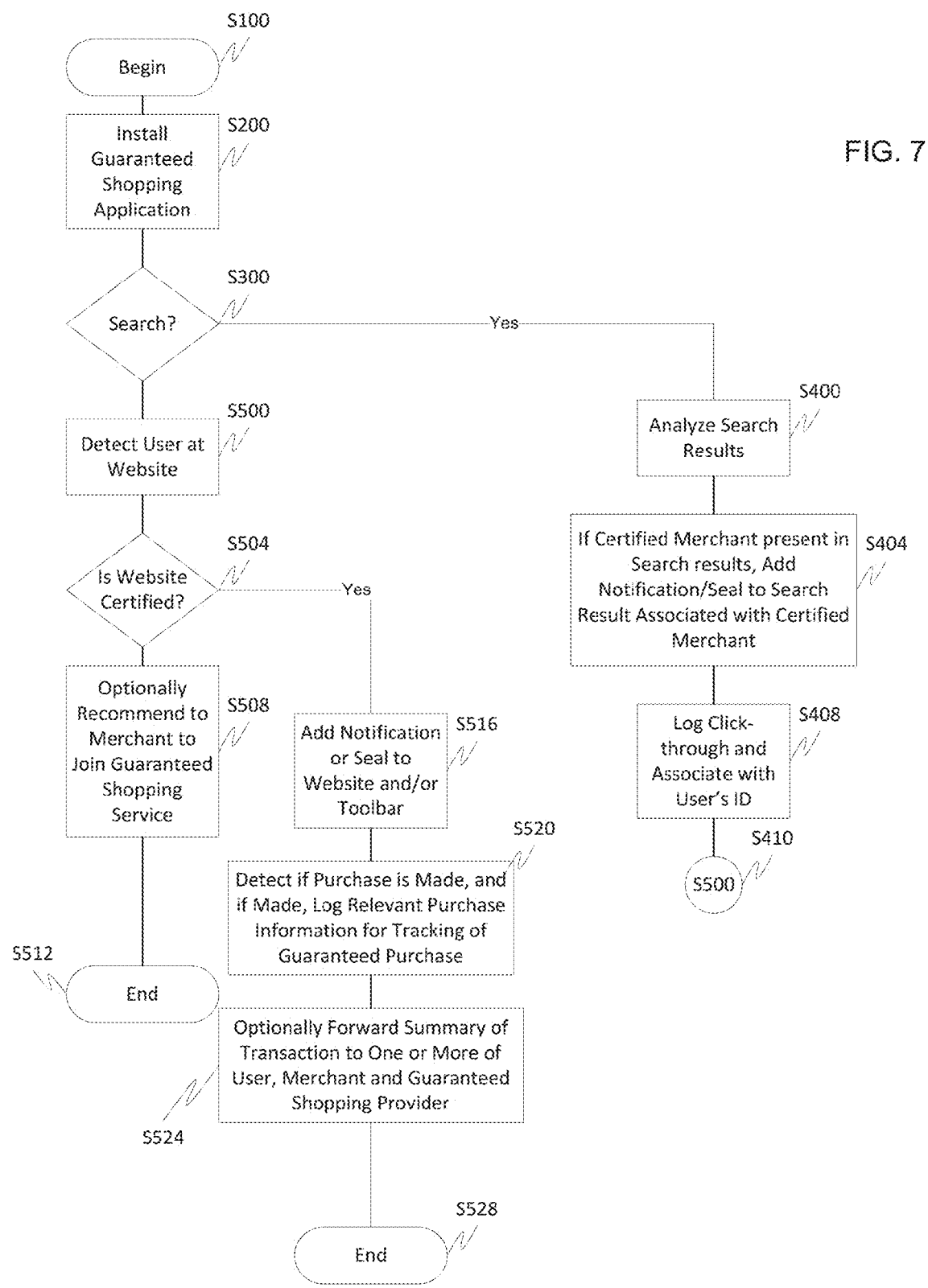

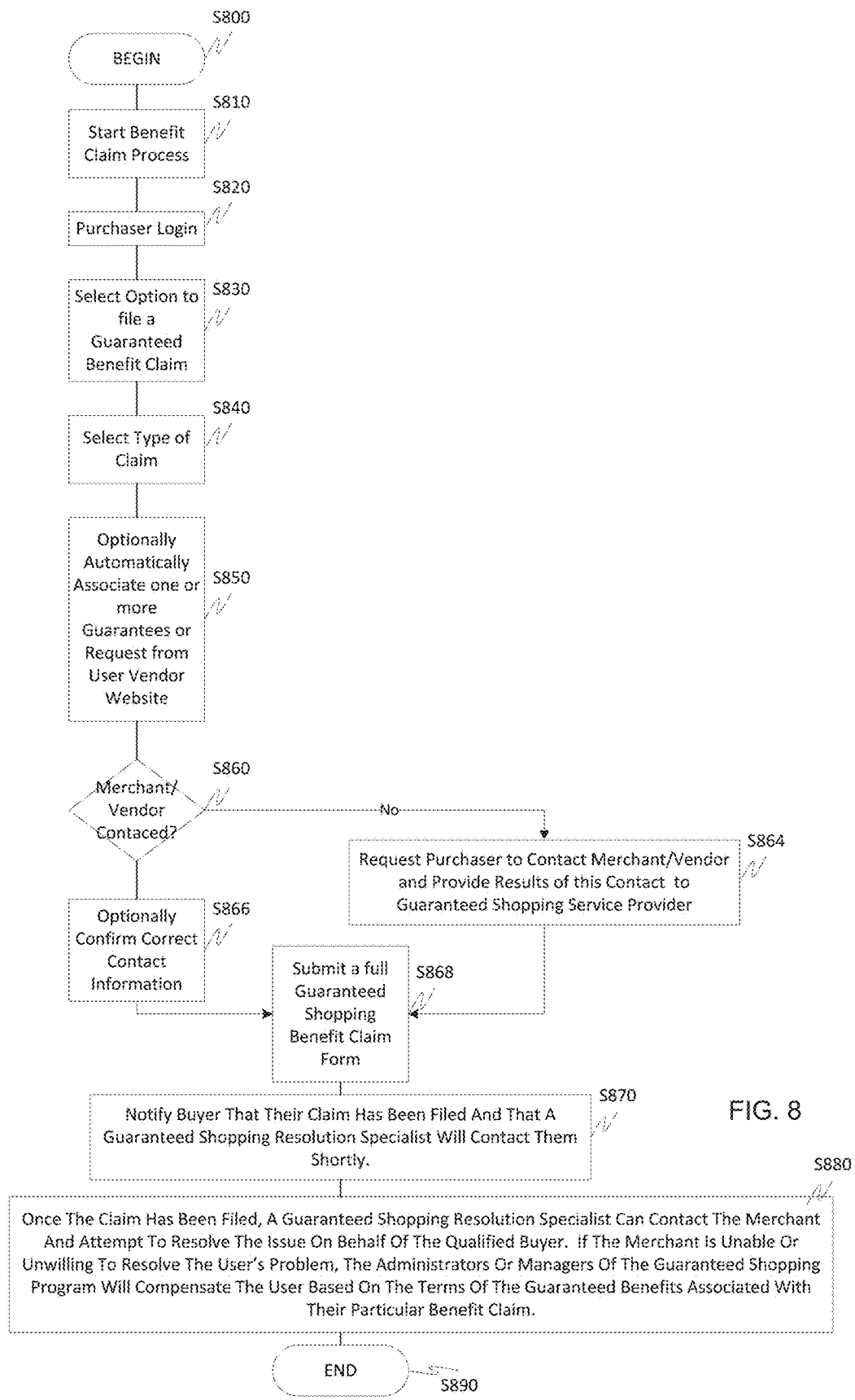

USER TO WEBSITE GUARANTEED SHOPPING

RELATED APPLICATION DATA

This application is a continuation of U.S. application Ser. No. 14/243,542, filed Apr. 2, 2014, which is a continuation of U.S. application Ser. No. 13/758,706, filed Feb. 4, 2013, now U.S. Pat. No. 8,700,487, which claims the benefit of and priority under 35 U.S.C. §119(e) to U.S. Patent Application No. 61/594,758, filed Feb. 3, 2012, entitled "User to Website Guaranteed Shopping," which is incorporated herein by reference in its entirety.

BACKGROUND

Internet fraud and cybercrimes are both tremendous problems. The FBI has dedicated sites to address these problems as well as guidance for computer users to protect themselves. Given the extent and diversity of the various cybercrime and fraud schemes, the government has had difficulty estimating exactly the extent of the crimes. Complicating this assessment is the fact that cybercrimes are international, and originate from outside U.S. borders.

Furthermore, there is no system to verify if a "merchant" hosting a website on the internet is legitimate and reliable.

SUMMARY

An exemplary embodiment of one technique disclosed herein provides shoppers with additional peace of mind by giving them a confident and guaranteed shopping experience when they buy from a verified merchant.

An exemplary three step process for providing this experience includes a merchant inspection, where a guaranteed shopping server inspects online merchants to assess their legitimacy, reliability, stability, and track record for providing a great online shopping experience to the buyer. Next, this service monitors merchants on a regular basis, such as daily, to ensure they always deliver on their terms of sale, thus assuring purchasers of an overall safe online shopping experience. Next, the guaranteed shopping service provides, for example, a 3-in-1 guarantee for added peace of mind for the purchaser. In accordance with one exemplary embodiment, a 30 day guarantee is provided to the buyer including ID theft protection up to, for example, $10,000, including comprehensive identity theft coverage to safeguard personal information of the buyer, a purchase guarantee, which is a full third party guarantee of the buyer's purchase, terms of sale of up to, for example, $1000, and a lowest price guarantee of up to, for example, $100. This is a guarantee such that if the same store's published price drops within 30 days of purchase, the guaranteed shopping service pays the difference. As with other types of guarantees, certain restrictions and terms may apply as is usual and customary in the business. Furthermore, if a buyer does experience a problem with an online merchant, a benefit claim can be made and once the claim is validated, guaranteed shopping coverage applies until the claim is resolved.

In accordance with another exemplary embodiment, a technology is disclosed that describes a guaranteed shopping program that tightly connects a software application on, for example, a user's desktop computer or mobile computing device, such as a desktop security product, web browser, web browser plug-in, a web browser helper object, a mobile application, a mobile browser, or the like, or a registered user at a specific website(s), to a collection of websites fitting a predetermined profile, such as utilizing a specific type or brand of SSL certificate, utilizing a website scanning/PCI compliance service, or fitting any predetermined set of qualifying characteristics. The guarantee of performance by a guaranteed shopping service provider can be independent of a relationship with the website operator.

In accordance with one example, a suite of products are provided, with the guaranteed shopping service being one of the products in the suite. For BuySAFE®, users of an exemplary desktop security application in the suite could utilize or be provided with a guaranteed shopping service on websites that use a particular SSL (Secure Sockets Layer) certificate, site scanning, or other website security solution.

As another example, users of a specific web-based service that employs a browser toolbar or mobile application could utilize guaranteed shopping technology on any, for example, e-commerce website.

As yet a further example, users of a comparison shopping search engine, or any specific search engine, could utilize a guaranteed shopping service on any purchase made from an online merchant that is a member or advertiser on the search engine's network.

In accordance with one exemplary embodiment, this guaranteed shopping methodology connects online shoppers and online merchants in a single cohesive and highly compelling integrated solution, enabling guaranteed shopping for users across potentially hundreds of thousands of websites. In doing so, this exemplary approach drives greater adoption and a tighter connection between the application, website users, and the collection of websites, with a unique value proposition that leverages one set of users to reinforce market demand for the other.

In accordance with some of the exemplary embodiments discussed herein, the descriptions used will be in the context of the iteration which includes desktop security application users and a collection of websites using a certain brand or type of SSL certificate. This approach is used to simplify the ensuing descriptions, but does not limit the use to this particular embodiment, which can be applied at least to the environments discussed above.

In accordance with one exemplary embodiment, the guaranteed shopping techniques disclosed herein are envisioned for all desktop security application users. Specifically, registered users can enjoy a guarantee on every purchase made on websites that utilize, for example, a particular brand of SSL.

Some of the exemplary benefits associated with this technology are that both the desktop security user and the website operators both benefit from using a specific brand or type of SSL. Higher user adoption, retention and trial-to-pay conversion rates for a desktop security product are provided due to an expanded value proposition—guaranteed shopping at a large percentage of online stores. Moreover, a new revenue stream for a desktop security appliance can be realized by upselling customers that choose not to renew but who still want a guaranteed shopping solution which can be provided as an optional service to consumers. Even further, increased market share and pricing power for a certain brand of SSL is realized as greater consumer traffic is directed toward a specific brand of SSL website and provides more value for specific SSL customers. Even further, the exemplary techniques can accelerate a guaranteed shopping program adoption through an innovative engagement opportunity for upselling a particular brand's SSL customers on a guaranteed shopping program via the buyer benefit claims process. Also, a certified website can gain access to an additional audience which can result in increased buyer traffic, sales, and profits.

In accordance with one exemplary operational embodiment, a user is a subscriber to a desktop security application. While some of the exemplary embodiments discussed herein will be directed toward this particular exemplary embodiment, it should be appreciated that a user not necessarily be subscribed to a desktop security application or platform or suite of products, but rather the techniques disclosed herein can be used independently, and/or in conjunction with some other type of service being provided. As one example discussed herein below, the guaranteed shopping service can be provided in conjunction with a toolbar that resides in the user's web browser, or via the web browser itself, with the underlying architecture providing all the benefits as discussed herein. In accordance with the desktop security exemplary embodiment, a registered user can receive signaling or other identifiers during, for example, a search routine, with this signaling or other identifiers identifying sites that will automatically provide the guaranteed shopping benefit at no additional cost. This would, for example, leverage browser-based toolbars and/or plug-in technology to enable signaling and search on all certified sites where guaranteed shopping will be provided. The guaranteed shopping technology provides the code and mechanism via the web browser or mobile browser to allow the guaranteed shopping guarantee to be implemented. This could be implemented via a toolbar, desktop application, etc, or via any other comparable delivery mechanism.

For example, user registration can include any typical registration process which enables the user to be tracked, either via a unique identifier in the application or, for example, via a user login and password. The certification the guaranteed shopping service provider performs can be independent of a relationship with the website operator and the presence of any guaranteed shopping provider code on the website. The certification may or may not always be dependent on the use of a particular brand's SSL, and could, for example, instead be based on any number of attributes, characteristics or other factors that may be common between websites. A certified site must however be in good standing for the guaranteed shopping technique to be enabled and persist.

As non-limiting examples, the following attributes could be used to determine certification and/or eligibility for a website, web site owner, or website operator in any combination, or none at all.

Website Content Attributes:

Does the website display a particular PCI Compliance badge?

Does the website employ a particular security scanning service badge?

Does the website have a posted Privacy Policy? Is it Truste® verified?

Does the website display a particular badge signifying membership in an organization or group? (Better Business Bureau®, Internet Retailer® Top 500, etc.)

Does the website display other specific Trust Badges (Google® Trusted Store, buySAFE®, etc.)

Does the website employ a particular review services? (BizRate®, Reseller Ratings®, Stella®, etc.)

Does the website show a particular Social Integration? (Facebook®, Twitter®, Pinterest®, etc.)

Does the website employ certain ad network content and/or ROI (Return on Investment) tracking services?

Does the website sell or not sell a particular category of product?

Does the website use a real-time support system like a chat system?

Does the website have a toll-free telephone number?

Website Functional Attributes:

Does the website have an SSL certificate from a known trusted provider and/or a particular partner?

What is the age of the website's domain registration

Who is the website's ecommerce provider?

Which payment methods does the website accept? (Visa®, MasterCard®, Discover®, Amex®, Paypal®, BillMeLater®, etc)

What shipping options are offered by the website?

Does the website offer a login capability?

Does the website offer loyalty programs or other incentives?

What is the (perhaps estimated) size and/or depth of the website?

What is the estimated number of product SKUs available for purchase on the web site?

Does the website have a mobile optimized version?

Does the website use a Content Delivery Network (CDN)?

Are the website's transactions a 1-time purchase (like typical ecommerce), or a recurring subscription purchase?

What is the geographic location of the website, website owner, and/or website operator's business headquarters What is the website's domain country-code?

Other 3rd Party Attributes

Is the website's domain listed or flagged as a harmful site in some $3^{rd}$ party service because of malware, spam, or other undesirable attributes?

What is the website's estimated monthly visitor count?

Is the site present on particular search engines?

Is the site present on particular shopping related search engines?

What is the website's specific search engine ranking for particular keyword searches?

What is the website's internal ranking or score within a particular search engine? (Google® PageRank, etc)

Who are the website's direct competitors?

What particular visitor profiles tend of visit the website? (Geographic location, etc.)

Does the website employ certain remarketing services?

Does the website send particular post-transaction customer service or customer satisfaction emails?

BuySAFE® Specific Attributes

Was the visitor directly referred from a particular business partner site or system?

Is the website a buySAFE® customer in good standing?

Has the website opted in or out of the service or a related service?

Has the website been flagged as ineligible due to volume of disputes or any other factors?

Has the website, website owner, and/or website operator been subjected to identity verification?

Has the website received a relevant amount of buyer feedback, positive or negative?

Does the website have any other kind of relationship with buySAFE?

Does the website sell restricted merchandise?

Does the website employ any other attributes that are related to a particular business partner with buySAFE®?

The guaranteed shopping technique can also be provided to a desktop security user who purchases from any and all certified sites using a particular brand's SSL. When a desktop security user arrives on a certified website using a particular brand's SSL, a guaranteed shopping seal, or other visible notification, present for example in the toolbar, and/or overlaid in-line with the webpage itself, can be automatically displayed in the user's browser, on the user's desktop, and/or the like. Similarly, this guaranteed shopping seal can appear anywhere on the user's desktop display and is not limited to being just displayed in conjunction with the browser. This seal, and where applicable, a seal rollover, can provide added messaging to notify the user that a guaranteed shopping service is being provided from that site. In accordance with one exemplary embodiment, how the user arrives at the site is irrelevant. In this exemplary embodiment, the toolbar enables the seal and the browser where the seal and the guarantees are provided only for a particular application user, and all other visitors to brand X's SSL site neither receive the messaging around a guarantee nor are their purchases guaranteed (unless of course the online merchant has been upsold or is a current customer).

In accordance with this exemplary embodiment, all purchases at the site are automatically guaranteed, optionally in the presence of another application such as a desktop security application. The guaranteed shopping code records the date and time of visits to the certified specific brands SSL website by one of the desktop security users who has also enabled the guaranteed shopping service. This logging provides relevant information that can be used later, such as when a benefit claim needs to be made. In accordance with one exemplary embodiment, no personally identifiable information or other purchase information is collected by the logging technique. However, it should be appreciated that as needed, personally identifiable information and purchase information, such as item, price, method of payment, etc. could be collected. This record can be utilized in the benefit claim process to validate a user prior to processing a benefit claim. If a user wishes to make a benefit claim under any of the guarantees provided, they can go to a dedicated website and, for example, click "file a guarantee benefit claim," to start the benefit claim process.

An alternative to benefit claims via a specified website include, for example, a link provided in a toolbar of a browser or via multiple websites that could be specified to the user. A more traditional phone number or other contact information could similarly be provided.

For benefit claims, when a user files a benefit claim, a typical claim includes information that is collected along with verification that the claimant was utilizing an active version of the guaranteed shopping application when the purchase was made. A date, time, and URL match associated with that license of the application can be used to validate whether the end user is eligible to make a claim. With the verification you can insure that the claimant was using an active version of the application when they visited the merchant's website on the date of the purchase where the guaranteed shopping guarantee was provided. Some exemplary further steps include determining whether a user has already tried to resolve the dispute with the merchant, and if the user has a problem associated with a purchase and has already contacted the merchant and was unable to resolve the problem, the guaranteed shopping techniques disclosed herein can provide a resolution specialist that can contact the merchant as the buyer's representative in order to help resolve the problem. It is generally believed that all certified merchants will want to resolve customer problems quickly, and efficiently, especially if they are receiving a call from their SSL provider. If resolution is unsuccessful, the guaranteed shopping provider can ensure that the buyer will be properly compensated per the guarantee terms and assumes the buyer's rights to recovery. A provided problem resolution call can enable, for example, the buyer's issue to be resolved in a positive way, and also enables, in the instance where the merchant does not participate in the program, a sales discussion with the merchant about why they should be using guaranteed shopping techniques for all of their sales, not just buyer traffic coming from, for example, a specific application user. Reasons for this can be increased conversion and profitability, enhanced customer satisfaction, and/or protection from difficult customers harming their online reputation and brand.

In terms of risk management, an initial certification process and ongoing risk-management technology can be used to manage risk, monitor benefit claims, and disable the service for websites with unusually high rates of claims. The technique may optionally initially certify all sites that use, for example, a particular brand of SSL, which may include but is not limited to verifying that they are a merchant in good standing with a valid SSL certificate from the SSL provider. While the primary risk is that the purchase guarantee claims for particular merchants would be higher than for typical other merchants, this risk is easily mitigated with, for example, BuySAFE's® proven risk management technology. Here, claims rates are also projected to be lower as a certificate of guarantee e-mail may not be sent to the application user which will reduce claim rates.

As a general exemplary value proposition, a user of a specific application, such as the desktop security application with BuySAFE® embedded code, may receive value in that the guaranteed shopping technology can be available across many thousands of websites which provides a significant value add. This can also be viewed as a long-term competitive differentiator. From a merchant perspective, for all merchants that use a particular brand of SSL or other key feature used in the certification process, they will have a no-cost way of providing guaranteed shopping for all of their buyers that use a particular application software, such as the desktop security application with BuySAFE® embedded code. Additionally, this product can drive increased buyer traffic to their website and provide those merchants with a first-hand view of the benefits of the guaranteed shopping techniques discussed herein. Automated reports could be sent to all merchants that use the specified brand of SSL letting them know what percentage of their website's buyer traffic is utilizing the desktop security application and that those purchases were guaranteed on their behalf for all desktop security users. This can be a powerful marketing message that adds value to both the merchants and buyers.

Additional exemplary benefit can be provided to, for example, the desktop security provider or comparable application provider which may have the guaranteed shopping techniques disclosed herein associated therewith. Here, there is an increased user adoption of the desktop security application with an increase in retention and trial-to-pay conversion rates. Moreover, a new revenue stream for the desktop security application can be realized by upselling consumers that choose not to renew but who still want to utilize the guaranteed shopping solution. Here, the guaranteed shopping solution can be offered as, for example, a separate service for all customers that attrite the desktop security application, but still want guaranteed shopping. This can transition to an increased market share and pricing power for a specific brand's SSL which in turn increases consumer traffic directed to a particular brand's SSL websites and provides more value for SSL customers. The increased market share and customer retention benefits can be significant where, for example, a 10% increase in market share/retention for a one hundred million dollar per year SSL business can equal a 10 million dollar a year in additional, high margin revenue. Moreover, the guaranteed shopping roll-out and adoption can be accelerated by leveraging problem resolution calls to drive engagements for upselling a particular brand's SSL customers on the guaranteed shopping product will drive faster growth for guaranteed shopping.

Below are certain exemplary implementation details and product explanations that may be associated with a guaranteed shopping rollout and service explanation. It should be appreciated that these are only exemplary, are not required, may be different and/or only a portion of them used, or not provided at all:

From a customer's perspective:

1) Does the 3-in-1 Guarantee cover international buyers too?

Yes, one exemplary guarantee applies to all buyers regardless of where they are located in the world. Note that the Identity Theft Protection coverage may only be available only to U.S. residents.

2) How can a buyer confirm a site is really a guaranteed merchant?

For sites displaying a seal or notification as discussed, a user only need to simply click on the seal or notification to verify. A webpage hosted on a guaranteed shopping provider server(s) will provide the verification. Alternatively, buyers may "Verify a Merchant" on a main page of a buyer's section of the webpage hosted on a guaranteed shopping provider server(s).

If one believes that they have encountered a merchant inappropriately representing themselves as a guaranteed shopping merchant, the user can report it.

3) If a buyer has a problem transaction, how is a purchase guarantee claim reported and resolved?

In the rare instance that a buyer has a problem with a verified merchant, it could be recommended that the buyer first contact the merchant directly to attempt to resolve the matter. Typically, buyers and merchants can quickly resolve typical issues on their own without the guaranteed shopping service provider's intervention. If a buyer and merchant are unable to reach resolution, buyers can "Make a Guarantee claim" on a webpage of the guaranteed shopping service provider's website.

Once a purchase guarantee claim is reported, the guaranteed shopping service provider can provide an optionally free problem resolution services through which buyers and merchants can "talk to" each other using a moderated online communication area. If the problem can't be worked out, a guaranteed shopping service provider's problem resolution specialist can assist in finding a solution. For problems where a mutually satisfactory resolution cannot be found, or upon the request of either party, the guaranteed shopping service provider can refer the matter to the guaranteed shopping service provider's claim services for a final coverage ruling.

It is believed this exemplary process is a process that the overwhelming majority of both merchants and buyers really like. It helps resolve disputes in a structured way that typically results in both parties pleased with the outcome. For merchants, this process also helps reduce credit card chargebacks as the problem resolution process gives buyers an alternative avenue for getting their problem resolved in a fair and impartial manner.

4) When does the guaranteed shopping service provider get involved in a purchase dispute?

The guaranteed shopping service provider may only become directly involved in a dispute when either a merchant or a buyer requests assistance.

5) How long do benefit claims typically take to resolve?

For purchase guarantees, problem resolution is recommended to take no longer than two weeks and frequently, it can be much faster.

For Lowest Price Guarantees, benefit claims processing is recommended to take 1-4 business days.

For identity theft protection, buyers are put in contact with remediation specialists as quickly as possible, it is recommended within 1 business day.

6) How are outstanding purchase guarantee claims closed out?

It is recommended that only buyers and guaranteed shopping service providers may close out an outstanding purchase guarantee claim. If a merchant feels that a dispute has been resolved, they can post an update to the dispute which contacts the buyer to request that they close the dispute. Alternatively, merchants may contact the guaranteed shopping service provider's customersupport@ guaranteedshoppingservice provider.com and request a claim be closed. The guaranteed shopping service provider's personnel can also routinely contact buyers to help facilitate resolution of a claim and can then determine if a dispute has been resolved for closure.

From the Merchant's Perspective:

1) Why use?

When internet users feel completely safe & confident, they are more likely to buy, to buy more and to buy more often. The guaranteed shopping program enables merchants to provide their buyers with increased confidence and added value via a special guaranteed shopping experience. Guaranteed shopping increases, for example, confidence and safety for online buyers and profits for online merchants. It's a win-win!

2) Why should merchants use the guaranteed shopping technology?

Guaranteed shopping technology enables merchants to provide their shoppers added confidence and value— via a guaranteed shopping experience.

The added confidence and value merchants provide buyers with the guaranteed shopping technology translates directly and immediately into higher website profitability and increased customer satisfaction. The guarantee shopping program has been proven, in an exemplary implementation, to increase website conversion and sales by 6.1% 1 on average and overall site profitability by 20% or more. Merchants also enjoy longer term benefits including increased buyer loyalty as measured by increases in increased repeat buyer rates3.

Pricing can optionally be based on the additional profit merchant's earn from using the program and is guaranteed to provide a minimum of a 5× Profit ROI, using the guaranteed shopping technology can make ecommerce businesses much more successful.

3) What does the guaranteed shopping program do?

It turns internet shoppers into buyers by increasing buyer confidence and providing buyers added value through a tangible, third party guarantee. The guaranteed shopping program enables merchants to provide their buyers with a free 3-in-1 Guarantee that includes:

$10,000 Identity Theft Protection
$1,000 Purchase Guarantee
$100 Lowest Price Guarantee
Guaranteed Shopping increases merchant profitability and buyer satisfaction. All the terms of the 3-in-1 Guarantee can be found, for example, with reference to a website.

4) Can the guaranteed shopping program really make merchants more money?

YES! The guaranteed shopping program is a proven solution for increasing website profits and customer satisfaction. Comprehensive testing shows that the guaranteed shopping program typically increases website conversion and sales by 3-15% with an average increase of 6.1%. The guaranteed shopping program can also increase buyer loyalty. The guaranteed shopping program's highly-sophisticated impact testing tools enable merchants to test the guaranteed shopping program on their website to objectively measure the impact on their business.

Note, the placement of the guaranteed shopping program graphical elements and/or notifications on a website has a material impact on overall results. Placement above the fold on all pages is highly recommended.

5) Who uses the guaranteed shopping program?

There are more than 5,000 websites around the world with billions in online sales every year using the guaranteed shopping program. It is proven to be effective on the sale of both large- and small-ticket items and across all product types, so merchants everywhere can benefit from the program.

6) Why is the guaranteed shopping program a must have for emerging merchants too?

Being an internet merchant is tough, but the deck is really stacked against those competing against the biggest merchants. The economics put them at a huge disadvantage:

They pay more for inventory
They pay the same costs for advertising
Shoppers feel less confident buying from them While the guaranteed shopping program is used by almost 10% of the Top 1000 largest ecommerce websites and some of the biggest ecommerce merchants on the internet, it's even more valuable for the other 500,000+ ecommerce merchants on the internet. To compete effectively, smaller merchants must close the consumer confidence gap and a guaranteed shopping program the single best way to do this. Just as David beat Goliath by being smarter and using better technology (the slingshot) to win the day, emerging merchants can do the same. The guaranteed shopping program is the slingshot for emerging merchants.

7) How much does it cost?

Pricing can be based on sales volume and the additional profit generated by the guaranteed shopping program. While most Merchants receive $10 in additional profit for every $1 paid, merchants can be guaranteed to receive at minimum of $5 (a 5× Profit ROI) when using the guaranteed shopping program.

Simply put, the guaranteed shopping program doesn't cost merchants anything as it generates 5-10×+ its cost in added profit. Every day that a merchant is not using the guaranteed shopping program costs them serious money in lost profit opportunity.

8) What are the minimum requirements to become a Merchant?

While some of the biggest companies in the world are merchants, it's a solution that all professional retailers will benefit from. To be eligible, a merchant must have a track record of success, be financially stable and committed to delivering on the promises they make their buyers.

For merchants interested in finding out if they qualify, simply apply online or call us at 1.888._._. Our "Quick Start" application takes just minutes to complete. Some basic information about the business and business owner (for privately held companies) is requested so that a business inspection and identity verification check can be completed.

For merchants approved online, they may begin using the guaranteed shopping program immediately.

9) How do merchants install the guaranteed shopping program?

Merchants are provided with three small snippets of HTML code that enable the install of all three guaranteed shopping program elements—the Seal, "Conversion Kicker" and "Guarantee Notification." Installing the entire program typically takes less than one hour. A link to the buySAFE® Guaranteed Installation Guide can also be provided.

10) Many merchants already use a Security Seal like VeriSign®, McAfee® or Norton®. Why do they also need the guaranteed shopping program?

Security seals are necessary in today's world of phishing and identity theft. However, they provide no resolution in the event something goes wrong. With the guaranteed shopping program, merchants provide their buyers a great deal of added value with three guarantees in one, that are specifically designed to address each of the three biggest risks consumer fear when buying online.

Economically, using the guaranteed shopping program is a no brainer. The conversion and profit lift the guaranteed shopping program provides merchants are in addition to any other benefits they are already receiving from their security seals. Merchants can measure this for themselves via a straightforward and objective, A/B split test.

11) Why does the service provider need a credit card?

A valid credit card can be an important part of the guaranteed shopping program's merchant inspection process and can be used to pay any fees owed.

12) What does the 3-in-1 Guarantee cover?

The 3-in-1 Guarantee can include:
$10,000 Identity Theft Protection
$1,000 Purchase Guarantee
$100 Lowest Price Guarantee
Note that the 3-in-1 Bond Guarantee provides a purchase guarantee for up to $25,000.

13) For how long is a 3-in-1 Guarantee valid?

The Guarantee can automatically expires thirty (30) days from the date of purchase. All benefit claims may be made within thirty (30) days of the date of purchase in order to keep benefits, even if all the terms of sale are not yet fulfilled. Once a valid benefit claim is made, coverage applies until the claim is resolved.

14) How does the guaranteed shopping program protect merchants from fraudulent buyers?

After tens of millions of guaranteed transactions, the guaranteed shopping program claims process is optimized to protect merchants from fraudulent buyers. All claims can be investigated by experienced benefit claims professionals. Claimants are required to provide detailed information about their identity and purchase.

These procedures put a spotlight on both parties and the transaction as a whole to ensure that everyone is held accountable for their actions, including false allegations.

Exemplary, non-limiting aspects of the technology are directed toward:

1. A method for providing a third party guarantee in an online shopping environment comprising:

detecting, using a processor, at least one characteristic associated with one or more of a website, website owner and website operator, the least one characteristic used for determining one or more of eligibility and certification for a guarantee;

detecting, using computer code running on a user's device, an online purchase made via a web browser or mobile browser at the website; and automatically providing the guarantee for the online purchase when the one or more of the website, website owner and website operator associated with the website is certified or eligible to be certified.

2. The method of aspect 1, further comprising:

evaluating whether the one or more of the website, website owner and website operator is an acceptable risk, and wherein the guarantee is between two or more of: a user, a third party and the one or more of the website, website owner and website operator, and the guarantee is provided one or more of before, during and after completion of the online purchase.

3. The method of aspect 1, further comprising detecting a user login and recording the user login and one or more of an address of the website and user specific identifier.

4. The method of aspect 1, wherein the detection of an online purchase is made by analyzing one or more of code, data or information from the website.

5. The method of aspect 1, further comprising providing an indication when the one or more of the website, website owner and website operator is certified.

6. The method of aspect 5, wherein the indication is provided via one or more of in-line, in-line html, embedded within a web page, inserted within a web page, in a toolbar, in a task bar, in a mobile application, in a desktop application, on a TV, on another display device, audibly and via a seal.

7. The method of aspect 5, wherein the indication is provided in a search results page or other web page prior to the user visiting a certified website.

8. The method of aspect 5, wherein the indication is provided near one or more of the results in a search results page.

9. The method of aspect 1, further comprising providing a benefit claim process for a user to utilize a received guarantee.

10. The method of aspect 1, further comprising collecting and storing web browsing information.

11. The method of aspect 1, further comprising providing a summary of one or more guaranteed shopping transactions to one or more of a user, a certified website, certified website owner and certified website operator and a guaranteed shopping service provider.

12. The method of aspect 1, further comprising: providing a user with additional purchase options including one or more of: extended product warranties and product recommendations based on a user's previously guaranteed purchased.

13. A non-transitory computer-readable information storage media having stored thereon instructions, that if executed by one or more processors, cause to be performed the steps in aspect 1.

14. The method of aspect 1, wherein the one or more of the website, website owner, website operator, user and entity providing the guarantee are independent of one another.

15. The method of aspect 1, wherein the online purchase may include any interaction between user and the website, and wherein the online purchase is a non-financial transaction.

16. A system to provide a third party guarantee in an online shopping environment comprising:

a processor and application that detect at least one characteristic associated with one or more of a website, website owner and website operator, the least one characteristic used for determining one or more of eligibility and certificaton for a guarantee;

a purchase detection module that detects, using computer code running on a user's device, an online purchase made via a web browser or mobile browser at the website; and automatically providing the guarantee for the online purchase when the one or more of the website, website owner and website operator associated with the website is certified or eligible to be certified.

17. The system of aspect 16, further comprising:

one or more guaranteed shopping servers that evaluate whether the one or more of the website, website owner and website operator is an acceptable risk, and wherein the guarantee is between two or more of: a user, a third party and the one or more of the website, website owner and website operator, and the guarantee is provided one or more of before, during and after completion of the online purchase.

18. The system of aspect 16, further comprising a login module that detects a user login and records the user login and one or more of an address of the website and user specific identifier.

19. The system of aspect 16, wherein the detection of an online purchase is made by analyzing one or more of code, data or information from the website.

20. The system of aspect 16, further comprising a display controller that provides an indication when the one or more of the website, website owner and web site operator is certified.

21. The system of aspect 20, wherein the indication is provided via one or more of in-line, in-line html, embedded within a web page, inserted within a web page, in a toolbar, in a task bar, in a mobile application, in a desktop application, on a TV, on another display device, audibly and via a seal.

22. The system of aspect 20, wherein the indication is provided in a search results page or other web page prior to the user visiting a certified website.

23. The system of aspect 20, wherein the indication is provided near one or more of the results in a search results page.

24. The system of aspect 16, wherein a benefit claim process is provided for a user to utilize a received guarantee.

25. The system of aspect 16, further comprising a controller that collects and stores in storage web browsing information.

26. The system of aspect 16, wherein a summary of one or more guaranteed shopping transactions is provided to one or more of a user, a certified web site, certified website owner and certified website operator and a guaranteed shopping service provider.

27. The system of aspect 16, further comprising an ad module that provides a user with additional purchase options including one or more of: extended product warranties and product recommendations based on a user's previously guaranteed purchased.

28. The system of aspect 16, wherein the one or more of the website, website owner, website operator, user and entity providing the guarantee are independent of one another.

29. The system of aspect 16, wherein the online purchase may include any interaction between user and the website, and wherein the online purchase is a non-financial transaction.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. §112, Paragraph 6. Accordingly, a claim incorporating the term "means" shall cover all structures, materials, or acts set forth herein, and all of the equivalents thereof. Further, the structures, materials or acts and the equivalents thereof shall include all those described in any portion of this document. Any one or more of the embodiments herein can therefore be claimed using means-type language.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

These and other features and advantages of this invention are described in, or are apparent from, the following detailed description of the exemplary embodiments.

BRIEF DESCRIPTION OF THE DRAWINGS

FIG. 6 illustrates an exemplary toolbar and an indicator is provided that a guarantee is automatically provided from this merchant;

FIG. 7 illustrates an exemplary method of operation for the guaranteed shopping techniques according to this invention; and FIG. 8 outlines an exemplary benefit claim process.

DETAILED DESCRIPTION

For purposes of explanation, numerous details are set forth in order to provide a thorough understanding of the present invention. It should be appreciated however that the present invention may be practiced in a variety of ways beyond the specific details set forth herein. Furthermore, while the exemplary embodiments illustrated herein show various components of this system collocated, it is to be appreciated that the various components of the system can be located at distant portions of a distributed network, such as a the Internet, LAN, WAN or within a dedicated secured, unsecured, and/or encrypted system.

Thus, it should be appreciated that the components of the system can be combined into one or more devices, or split between devices. As will be appreciated from the following description, and for reasons of computational efficiency, the components of the system can be arranged at any location within a distributed network without affecting the operation thereof Furthermore, it should be appreciated that the various links 5 and networks 10, including any communications channel(s) connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element.

As discussed above, the guaranteed shopping techniques will be discussed in relation to providing the service as an extension to a desktop security platform offered in partnership with BuySAFE®. However, as will be appreciated, the guaranteed shopping techniques disclosed herein can be used independently of the desktop security application (and optionally independent of BuySAFE®) and are in no way limited to use in conjunction with that particular application. However, in accordance with one exemplary embodiment, the desktop security application offers a unique and an effective way to add value to both the desktop security application, for example, increased adoption and retention as well as provide an effective platform for rapid growth revenue complimented by new revenue streams. Use of this exemplary platform or comparable platforms could be capitalized upon through the extension of adding the guaranteed shopping techniques discussed herein to other suites of products or offerings.

Figure 1:
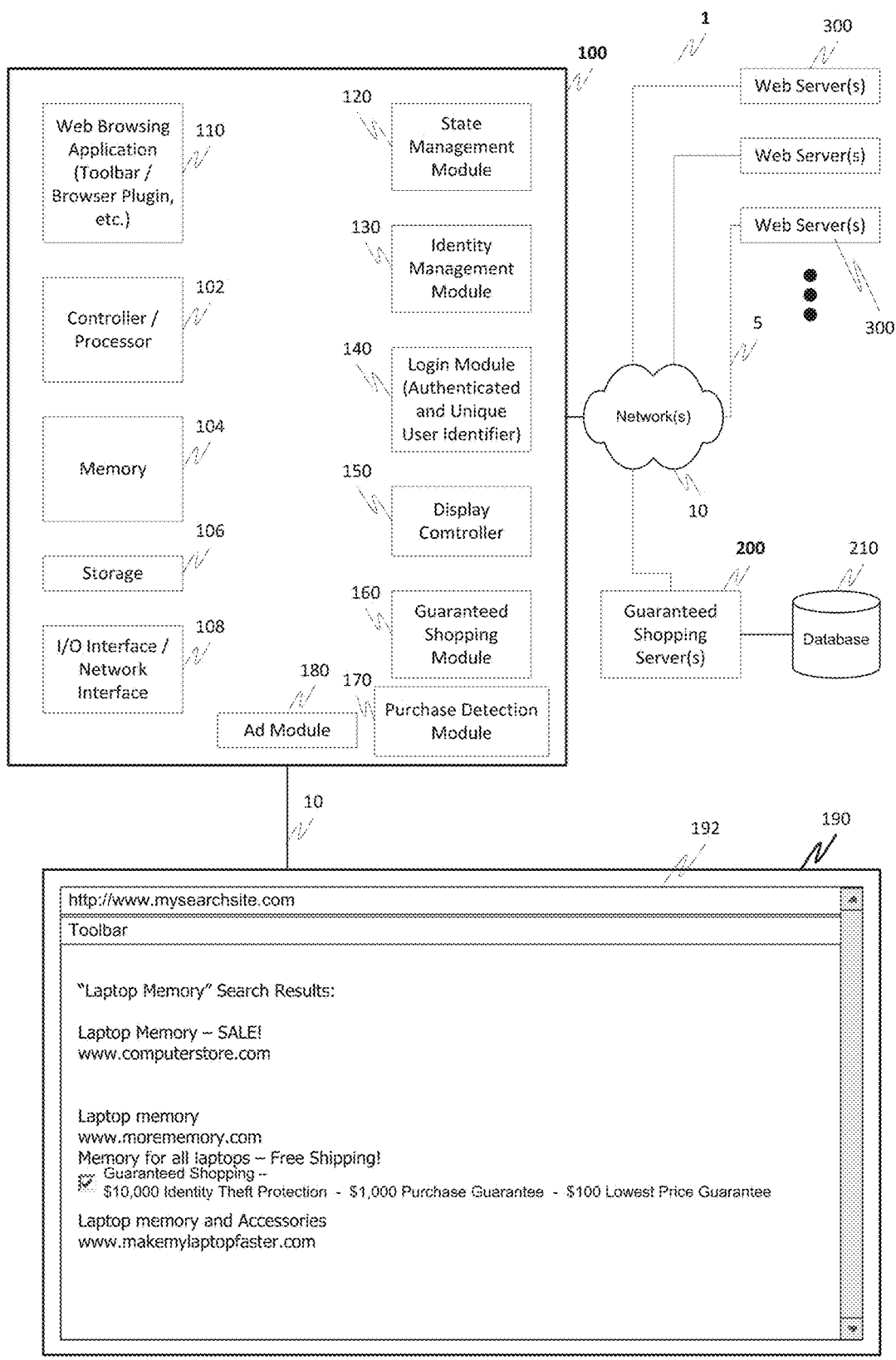
FIG. 1 illustrates an exemplary guaranteed shopping environment according to this invention.

FIG. 1 illustrates an exemplary guaranteed shopping environment according to one exemplary embodiment. The guaranteed shopping environment one includes a user device 100, one or more webservers 300, and one or more guaranteed shopping servers 200.

The user device 100, such as a personal computer, mobile computer, smartphone, laptop, or the like, includes a web browsing application 110, that can optionally include a toolbar, browser plug-in, or the like, a controller/processor 102, memory 104, storage 106, I/O interface/network interface 108, a state management module 120, an identity management module 130, a login module 140, a display controller 150, a guaranteed shopping module 160, a purchase detection module 170, and an ad module 180. Associated with the user device is a display 190, that can display, for example, a webpage 192 that will be discussed hereinafter in greater detail. User device 100 is connected via one or more links 5 and networks 10 to one or more web servers 300 that serve various webpages and/or content as requested by a user. User device 100 is further connected to one or more guaranteed shopping servers 200 which are in turn connected to one or more data bases 210, the guaranteed shopping servers in general maintaining information as to which websites and merchants are associated with the guaranteed shopping guarantee.

In accordance with exemplary embodiment, and in order to enable a guaranteed shopping guarantee, a specific guaranteed shopping computer code must be present during the user's browsing/shopping experience. This "application" or code (for which pseudo code is provided later in the document) serves as the delivery mechanism for the guaranteed shopping code and optionally for the end-user license agreement.

In one example, the application can be written in JavaScript®, and delivered into a user's web browser and the web browsing application 110 via, for example, a toolbar or browser plug-in. In another example, the JavaScript® can be introduced via a specialized application running on a mobile or desktop platform. This application, in conjunction with one or more of the controller 102, memory 104, storage 106, and state management module 120 maintains a user's state and/or identity, and optionally, with the login module 140, any login session information required by the application itself. In general, the application should maintain an authenticated and unique identifier for the user, e.g. a login or user key, which can be captured, for example, upon starting of the browsing application, or upon visiting a particular shopping site, or the like.

When a user is on, for example, a search page looking for a particular product or service, the application can determine which search results refer to certified sites, for example with reference to a cache and/or from the guaranteed shopping server(s) 200 that are in good standing, and can inject additional code into the search results so as to display the guaranteed shopping seal or notification as illustrated herein. This exemplary seal or notification could take multiple forms including, for example, inline images and/or text, one or more popup notifications, and one or more in-application signals.

Continuing with this example, when a user follows one of the certified site search results, the time and date of their click-through can be recorded and associated with the unique identifier in conjunction with the login module 140, identity management module 130, and state management module 120. When on any non-search webpage, the application must determine if the active page belongs to a certified site that is in good standing, which is accomplished by the user device 100 communicating with one or more of the guaranteed shopping servers 200, and associated data bases 210. If the active page does belong to a certified site, then the user device 100 injects additional code to display on display 190 showing the guaranteed shopping seal, notification, and/or other audible or visual indicator. Similarly, the seal, notification or indicator could take multiple forms, as discussed above. It follows then, that every webpage within a certified site can have the guaranteed shopping seal/notification displayed. This seal/notification is displayed in conjunction with the display controller 150 that can optionally receive from, for example, the guaranteed shopping server 200 a seal or notification which can optionally be unique based on the particular type of service or product being guaranteed. For example, one particular notification or seal may be used for hotels, or a different notification or seal may optionally be used for computer products, etc.

The application must further determine if the user has successfully completed a purchase from a certified site, and inject additional code to create the guarantee and record the fact that the transaction has been completed via the guaranteed shopping server 200 and databases 210. This is accomplished in conjunction with the purchase detection module 170 and the guaranteed shopping module 160, optionally in cooperation with one or more of controller 102, memory 104, and storage 106. A completed order may be determined using a combination of one or more of a set of predetermined patterns that distinguish the URL of a certified site's completed order page from the other URLs on the site, and the presence of certain data elements unique to a certified sites "completed order page".

Creating the guarantee includes certain detail data elements from the transaction including the date/time, the user's unique identifier from the application and the value of the transaction, all which are logged by a combination of one or more of the purchase detection module 170, guaranteed shopping module 160, login module 140, identity management module 130, state management module 120, as well as the controller 102, memory 104, and storage 106.

Additional optional data elements may be collected when available, including shipping cost, shipping zip code, and for each individual item purchased, the item's title, an item ID, the item's price, and the quantity purchased, as well as any other information which may be relevant to the purchase, including pages visited and products viewed prior to the actual purchase.

These data elements may be retrieved from the certified sites website and order completed page using various techniques including: detecting the presence of certain native data structures within the page, collecting data found in a webpage url structure, detecting the presence of encoded data elements within links on the page, and/or detecting the presence of displayable data elements when in the HTML of the page.

An algorithm within the application collects all required and optional data elements, and creates a guarantee (akin to a contract) for the purchase and both informs the user to the extent of the guarantee's benefits and allows for easy claims against the guarantee as required. The data collected may also be used to provide targeted advertising to the user, in conjunction with the ad module 180, including offering product warranties, product recommendations, or other offers personalized based upon the purchase just made and/or other profiling information available on the user and over time.

In accordance with an optional exemplary embodiment, upon the completion of a sale that is covered by the transaction guarantee, the guaranteed shopping servers 200 can create and send an e-mail to one or more of the user 100 and merchant that summarizes all the details regarding the purchase and confirms the safe shopping guarantee.

For existing users of an associated platform, such as the BuySAFE® or BuySAFE® partner platform, users may receive the guaranteed shopping service as an update. The terms and conditions, and acceptance of those terms, for guaranteed shopping can be included as an update to their existing end-user license agreement. For new application users, the guaranteed shopping technique can be included as a core feature associated with the application, where the terms and conditions will include terms for guaranteed shopping.

As illustrated in FIG. 1, the display 190 includes a browser window 192 that is populated in conjunction with one or more of the display controller 150, controller 102, memory 104, and storage 106. Here, the guaranteed shopping module 160 has injected in the search results page that the site www.morememory.com is a guaranteed shopping site, with the terms and conditions and benefits highlighted in-line and injected directly into the search results page itself. In more detail, upon a user entering a product into a web browser and associated search site, in conjunction with the I/O interface/network interface 108, and the application running on the user device 100, this information is forwarded to the guaranteed shopping server 200 which is then able to identify which websites will be included in the search results and provide any guaranteed shopping notifications and/or seals as appropriate.

Figure 2:
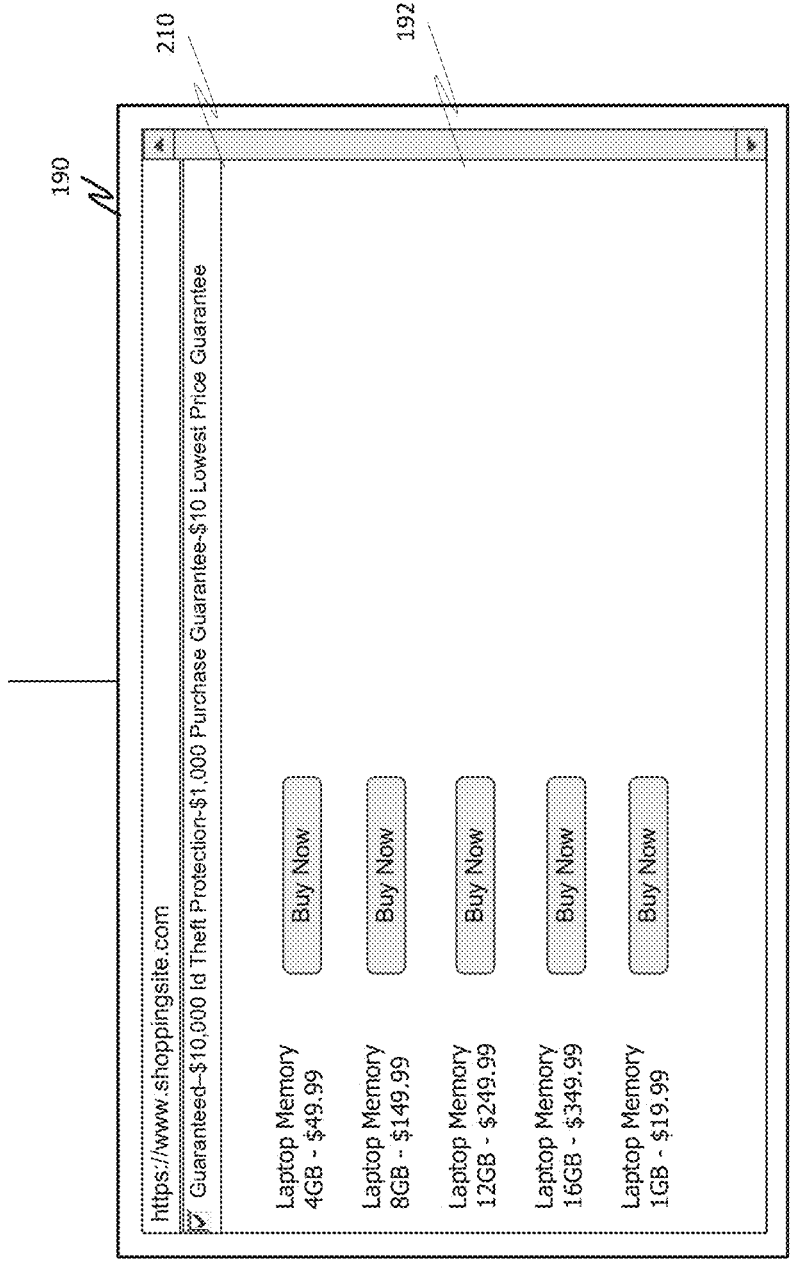
FIG. 2 illustrates an exemplary guaranteed shopping toolbar according to this invention.

FIG. 2 illustrates another exemplary embodiment of display 190 that includes a web browser and a toolbar 210. Here the toolbar 210 is indicating that the site www.shoppingsite.com is protected by the guaranteed shopping technology. In this manner, users are provided with the knowledge that all products purchased from the certified site are guaranteed by the guaranteed shopping guarantee.

Figure 3:
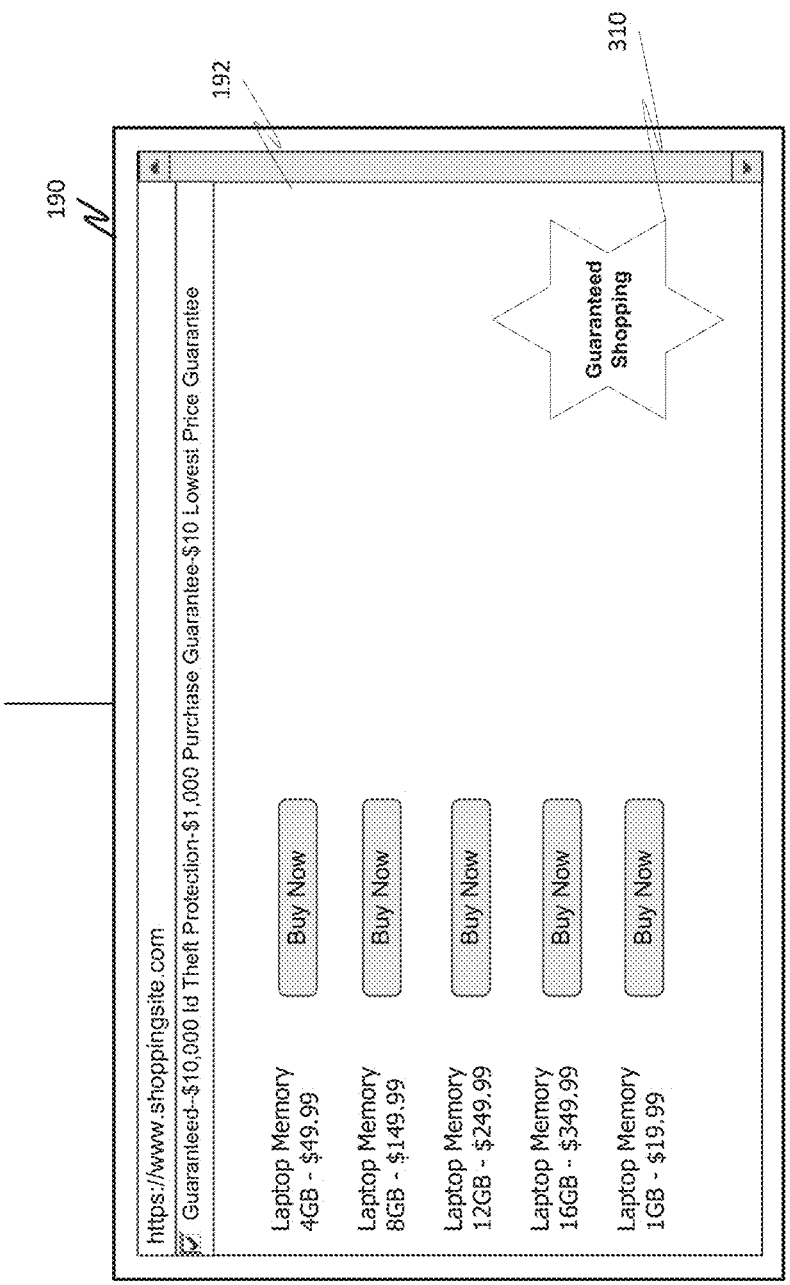
FIG. 3 illustrates an exemplary guaranteed shopping toolbar and guaranteed shopping logo according to this invention.

FIG. 3 illustrates an exemplary display 190 with a browser window 192 and toolbar, where a guaranteed shopping seal 310 is provided. This guaranteed shopping seal 310 can be clickable to reveal, for example, terms and conditions and/or linkable to take the user to an associated web site that provides all the relevant information regarding the guaranteed shopping technology. Again, the guaranteed shopping seal 310 in this exemplary embodiment would indicate that all products on the website associated with that particular store are guaranteed by the guaranteed shopping technology.

Figure 4:
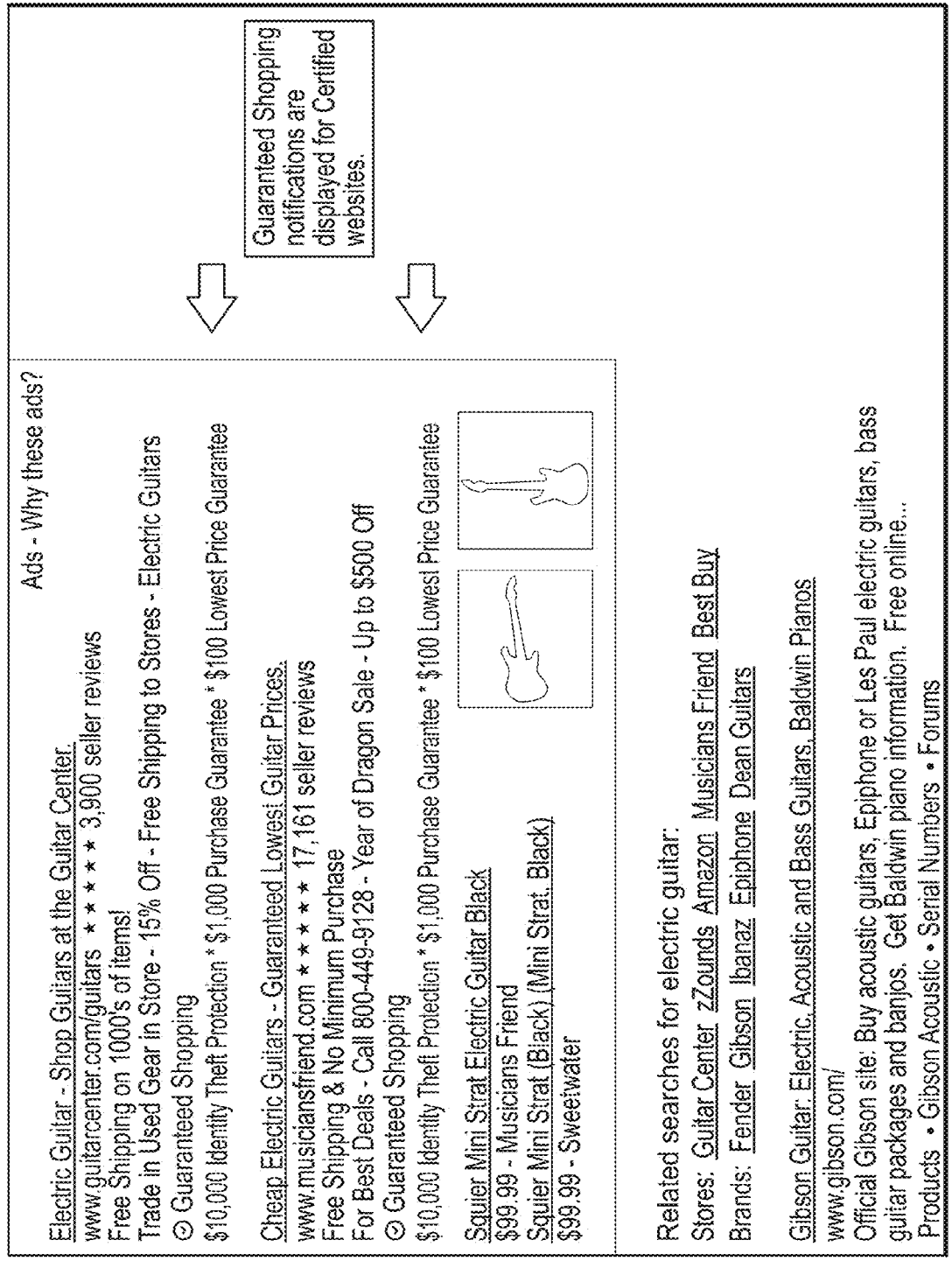
FIG. 4 illustrates an exemplary search results page where guaranteed shopping is shown in line with the search results.

FIG. 4 illustrates an exemplary real-world example of a search results page where guaranteed shopping technology is provided for the guitarcenter.com and for the musiciansfriend.com websites. The guaranteed shopping notifications are displayed for certified websites in-line, and here include a small graphic as well as text specifying the details about the guaranteed shopping service. In this exemplary embodiment, the notifications are shown in-line, and associated with their respective certified websites.

Figure 5:
FIG. 5 illustrates an exemplary toolbar that includes an icon indicating guaranteed shopping is available from this merchant.

FIG. 5 illustrates another exemplary embodiment where a BuySAFE® toolbar is provided, with a shopping cart indicating whether or not the guaranteed shopping guarantee is available. If a user, for example, clicks on the shopping cart or hovers over the shopping cart, a popup can be provided that indicates, for example, "When you purchase from this store, you will automatically receive a free transaction guarantee . . . " and a link can optionally also be provided therein that allows a user to learn more about the guarantee.

Figure 6:
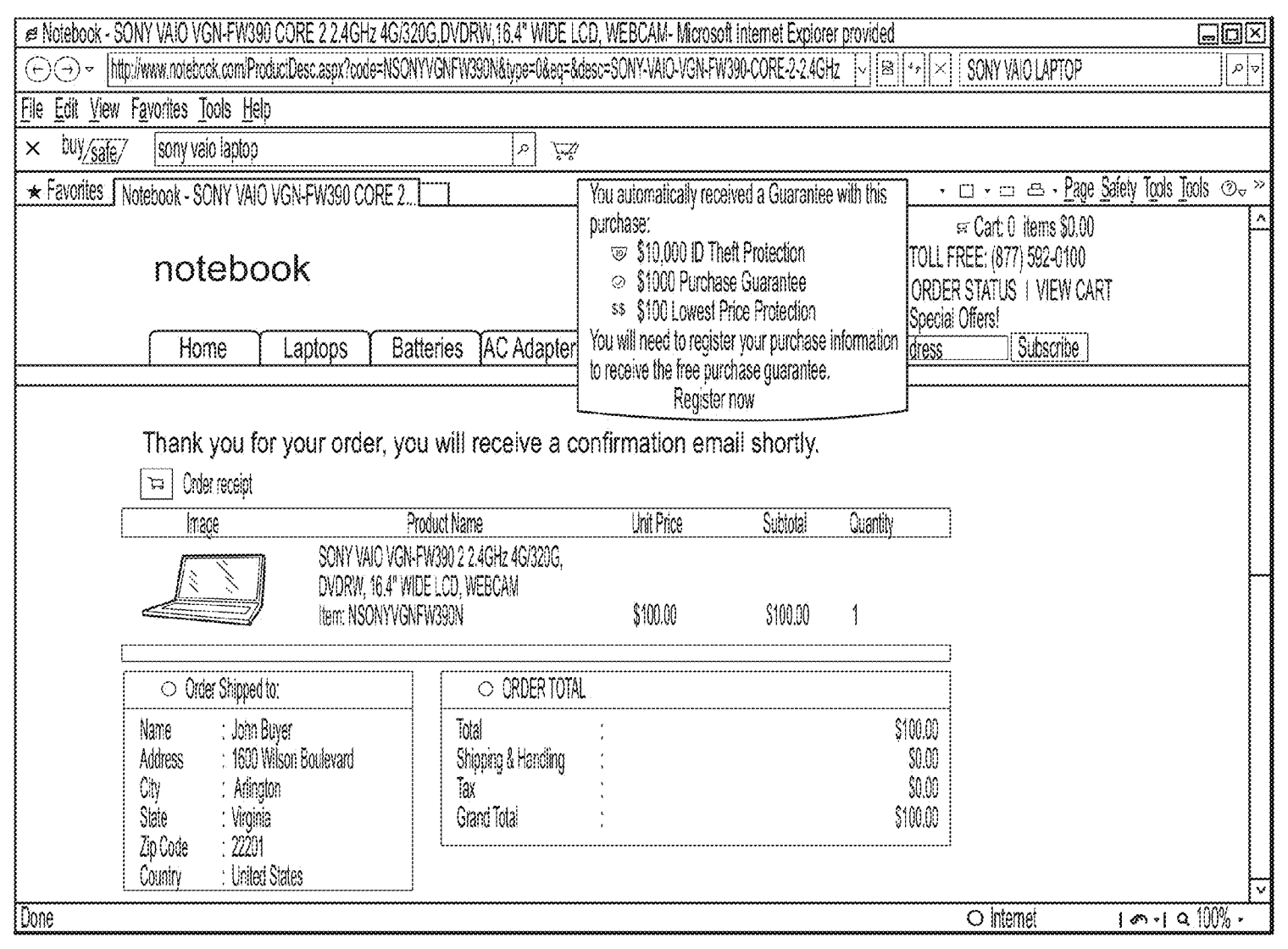

FIG. 6 illustrates another exemplary embodiment where again the user is using the BuySAFE® toolbar, but may have not signed up for the guaranteed shopping technology. Here, the toolbar can indicate that the guaranteed shopping guarantee is available, but that a user would need to register to automatically receive the guarantee for their purchase. Here, a link for "register now" is provided in the popup and the user hovers over or clicks on the guaranteed shopping cart. Upon registering, the user could then be eligible for the guaranteed shopping service.

If a qualified buyer has a problem with a purchase from a certified website, the buyer can be provided an intuitive way to file a claim, with information that can optionally be provided from the guaranteed shopping server (200). To file a benefit claim, and in accordance with an exemplary embodiment, the buyer would take the following steps:

1. The buyer would login to a guaranteed shopping dashboard provided by the guaranteed shopping server(s) 200, ideally using the application they used during the purchase.
2. The buyer would select "file a guaranteed benefit claim" or similar option for filing a claim online or via another device.
3. The buyer selects the type of claim that they need to file:
   3.1 Purchase guarantee.
   3.2 Identity theft protection.
   3.3 Lowest-price guarantee.
   3.4 Or any other type of guarantee provided.

4. If the user has an active application, all associated guarantees can be automatically associated with their account.
5. Otherwise, the purchaser is asked what website they used to make their purchase.
6. A buyer is asked whether or not they have contacted the merchant.
   6.1 If they have not contacted the merchant, they are instructed to do so. Contact information for the merchant can optionally be provided via the benefit claim website. In general, it is typical that the vast majority of problems can and will be resolved by the merchant without the need for the guaranteed shopping resolution specialist to get involved. However, there are some situations where buyer and the merchant do not reach an agreeable solution.
   6.2 If the buyer indicates that they have already contacted the merchant, they are asked to enter the phone number or e-mail address that they used to contact the merchant and, if possible, this is validated and if felt to be invalid, the correct contact information is provided.
7. Once the buyer has submitted the contact information from the merchant that they are filing a claim against, they are asked to submit a full guaranteed shopping benefit claim form that includes, for example, one or more of a description of the problem, date of purchase, description of items purchased, cost of purchase, receipt of purchase, if available, and/or any correspondence or summaries of conservations or communications that they have had with the merchant.
8. The buyer is then notified that their claim has been filed and that a guaranteed shopping resolution specialist will contact them shortly.
9. Once the claim has been filed, a guaranteed shopping resolution specialist can contact the merchant and attempt to resolve the issue on behalf of the qualified buyer. If the merchant is unable or unwilling to resolve the user's problem, the administrators or managers of the guaranteed shopping program will compensate the user based on the terms of the guaranteed benefits associated with their particular benefit claim.

FIG. 7 outlines an exemplary technique for offering a guaranteed shopping guarantee. In particular, control begins in step S100 and continues to step S200. In step S200, the guaranteed shopping application is installed or executed and an associated user account, such as with a user name, login and password are created. Then, in step S300, a determination is made as to whether the user is performing a search or the user is at a specific website. If the user is conducting a search, control continues to step S400 with control otherwise jumping to step S500.

In step S500, the user's presence at a website is detected. Next, in step S504, a determination is made as to whether that website is certified and optionally in good standing. If the website is certified and in good standing, control continues to step S516. Otherwise, control jumps to step S508. In step S508, and optionally, the user is provided with a tool that allows them to recommend to the merchant that they should join the guaranteed shopping service, and because they are not a participant in the guarantee shopping service, they will take their business elsewhere. Control then continues to step S512 where the control sequence ends.

In step S516, and when the website is certified, the website is identified as having the guaranteed shopping guarantee. This indication can be provided in one or more of a toolbar, on the webpage itself, or at any other location on the user's device and/or audibly. Next, in step S520, determination is made if a purchase has been made, and if a purchase has been made, the relevant information regarding the purchase is logged and information for tracking of that purchase saved on one or more of the user's device and a guaranteed shopping server. Then, in step S524, a summary of the transaction can optionally be forwarded, for example, via an e-mail, to one or more of the user, the merchant, and the guaranteed shopping provider. Control then continues to step S528 where the control sequence ends.

If the user is conducting a search, in step S400, the guaranteed shopping service analyzes the search results to determine whether or not any certified merchants are present in the search results. Next, in step S404, if a certified merchant is present in the search results, a notification, and/or seal is added to that search result associated with a certified merchant. As illustrated herein, this notification/seal can be included in-line and it can include one or more of graphics, text and/or audible notifications associated with a guarantee associated with that merchant. Then, in step S404, if a user clicks-through to a certified merchant's website, that click-through is logged and can be associated with that user's ID. Control then jumps to step S500.

FIG. 8 illustrates an exemplary method for an exemplary benefit claim process. In particular, control begins in step S800 and continues to step S810. If a qualified buyer has a problem with a purchase from a certified website, the buyer can be provided with a way to file a claim, with information that can optionally be provided from the guaranteed shopping server (200). To file a benefit claim, and in accordance with one exemplary embodiment, the buyer would take the following steps:

S800-S820—The buyer would login to a guaranteed shopping dashboard or website provided by the guaranteed shopping server(s) 200, ideally using the application they used during the purchase. However, the username/password combination could be used to login from any location. The purchaser could also be provided a link in an email that summarized the purchase. This link could take them directly to a benefit claim interface.

S830—The buyer would select "file a guaranteed benefit claim".

S840—The buyer selects the type of claim that they need to file:
  Purchase guarantee,
  Identity theft protection, and/or
  Lowest-price guarantee.

S850—If the user has an active application, all associated guarantees can be automatically associated with their account. Otherwise, the purchaser is asked what website they used to make their purchase. As above, this information could be embedded in a summarizing email and automatically provided to the benefit claim process.

S860—A purchaser is asked whether or not they have contacted the merchant.

S864—If the purchaser has not contacted the merchant, they are instructed to do so. Contact information for the merchant can optionally be provided via the benefit claim website and/or via the summarizing email. In general, it is typical that the vast majority of problems can and will be resolved by the merchant without the need for the guaranteed shopping resolution specialist to get involved. However, there are some situations where buyer and the merchant do not reach an agreeable solution.

S866—If the purchaser indicates that they have already contacted the merchant, they are asked to enter the phone number or e-mail address that they used to contact the merchant and, if possible, this is validated and if determined to be invalid, the correct contact information is provided.

S868—Once the purchaser has submitted the contact information from the merchant that they are filing a claim against, they are asked to submit a full guaranteed shopping benefit claim form that includes, for example, one or more of a description of the problem, date of purchase, description of items purchased, cost of purchase, receipt of purchase, if available, and/or any correspondence or summaries of conservations or communications that they have had with the merchant.

S870—The buyer is then notified that their claim has been filed and that a guaranteed shopping resolution specialist will contact them shortly.

S880—Once the claim has been filed, a guaranteed shopping resolution specialist can contact the merchant and attempt to resolve the issue on behalf of the qualified buyer. If the merchant is unable or unwilling to resolve the user's problem, the administrators or managers of the guaranteed shopping program will compensate the user based on the terms of the guaranteed benefits associated with their particular benefit claim. Control then continues to step S890 where the control sequence ends.

Regarding merchant participation and certification, in one exemplary embodiment, merchants/merchants don't have to do anything to become certified. The guaranteed shopping techniques do not necessarily have a direct relationship with the merchants at all, in fact. One exemplary embodiment utilizes webcrawler technology to identify a range of characteristics about the ecommerce site (e.g., what ecommerce platform, what type and brand of SSL, payment options available, location, types of product sold, various third party seals, various third party solutions, etc., and also other third party data sources (e.g., website traffic rankings from Compete® and Alexa®) to develop a profile on a merchant and calculated risk score. If the merchant is at or better than the risk score set as the cut off, they can be automatically certified. If the merchant ends up causing buyer disputes and claims, their certification can be revoked. Of course, merchants could also be vetted added and in a more traditional manual or semi-automated process as well.

Below is exemplary pseudo code outlining the processes occurring on the user (purchaser/buyer) device:

```
/* JavaScript-like Pseudo-Code */
/* NOTE: The "Application" must introduce this code on every Page View */
/* Step 1: Display the Guaranteed Shopping Seal */
if("Page URL's Domain" in [Set of Search Engine Domains]) {
    for each [Search Result on the page] {
        if("Search Result's Domain" in [Set of Pre-Certified Domains]) {
            (Display Guaranteed Shopping Seal)
        }
        else {
            Perform API call to determine status of "Search Result's Domain"
            if(Status is "Certified") {
                (Display Guaranteed Shopping Seal)
            }
            else Do Nothing
        }
    }
}
else if("Page URL's Domain" in [Set of Pre-Certified Domains]) {
    (Display Guaranteed Shopping Seal)
}
else {
    Perform API call to determine status of "Page URLTs Domain"
    if(Status) is "Certified" {
        (Display Guaranteed Shopping Seal)
    }
    else Do Nothing
}
/* Step 2: Determine if a purchase has been made, and issue a Guarantee if so */
if( ("Page URL" matches [Set of known "completed order" URL patterns])
OR (Page contains one or more of [Set of known "completed order" data elements])
) {
    for each Native Data Variable Name] {
        if(Name exists on page) {
            Collect its data
        }
    }
    for each [Encoded Data URL Pattern] {
        if(Any on page link matches Pattern) {
            Parse and decode URL
            Collect its data
        }
    }
    for each [HTML Element Identifier] {
        if(Any HTML Node matched Identifier) {
            Parse and decode HTML Node
            Collect its data
        }
    }
}
```

Where:
- [Set of Search Engine Domains]=A set of domain names known to be search engines
- [Search Result on the page]=The list of search results from a search engine result page
- [Set of Pre-Certified Domains]=A set of predefined domains names known to be ecommerce related and assumed to be permanently "in good standing"
- [Set of known "completed order" URL patterns]=A set of regular expression patterns that can be used to uniquely distinguish a store "order complete" page from any other page
- [Set of known "completed order" data elements]=A set of variable names or link-URL patterns to further distinguish a store "order complete" page from any other page
- [Native Data Variable Name]=A set of variable names known to represent specific data elements needed to issue a Guarantee
- [Encoded Data URL Pattern]=A set of regular expression patterns to be applied to all links within a page, where a matching link href is known to contain encoded variables that represent specific data elements needed to issue a Guarantee

[HTML Element Identifier]=A set of names known to reference specific HTML Node "ID" values that contain specific data elements needed to issue a Guarantee The exemplary systems and methods of this disclosure have been described in relation to computing devices, mobile computing devices, smartphones, tablets, systems, etc. and techniques. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links (such as link 5, optionally communicating over network 10) connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, re-ordering, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, the systems and methods of this disclosure can be implemented in conjunction with a special purpose computer, a programmed microprocessor or controller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or one or more means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for analyzing an online shopping environment comprising:
    detecting, using a processor, a plurality of characteristics associated with one or more of a website, website owner and website operator, the plurality of characteristics used for determining one or more of eligibility and certification, the plurality of characteristics at least including a domain name, a type of SSL certificate, a geographic region and a shopping cart;
    detecting, using computer code running on a user's device, an online purchase made via a web browser or mobile browser at the website, the detecting comprising using a combination of one or more of a set of predetermined patterns that distinguish a URL of a certified website's completed order page from other URLs on the website, and the detecting further comprising detecting a presence of data elements unique to a specific web page of a certified website; and
    automatically providing on a portion of the website an indication, the indication representing a presence of a guaranteed shopping technology for an online purchase when the one or more of the website, website owner and website operator associated with the website is certified or eligible to be certified.

2. The method of claim 1, further comprising:
    evaluating whether the one or more of the website, website owner and website operator is an acceptable risk,
    automatically providing a third party guarantee when the one or more of the website, website owner and website operator associated with the website is certified or eligible to be certified, wherein the guarantee is between two or more of: a user, a third party and the one or more of the website, website owner and website operator, and the guarantee is provided one or more of before, during and after completion of the online purchase.

3. The method of claim 1, wherein the plurality of characteristics further include one or a combination of the following including: a particular PCI Compliance badge, a particular security scanning service badge, a posted privacy policy, a particular badge signifying membership in an organization or group, display on the website of one or more specific trust badges, a particular review service, a particular social integration, certain ad network content, a certain return on investment tracking services, a particular category of product, a real-time support system, a toll-free telephone number, an SSL certificate from a known trusted provider and/or a particular partner, an age of the website's domain registration, a website's ecommerce provider, a payment method, shipping options, a login capability, loyalty programs or other incentive, a size and/or depth of the website, an estimated number of product SKUs available for purchase on the website, whether the website has a mobile optimized version, whether the website use a Content Delivery Network (CDN), whether the website's transactions are a 1-time purchase or a recurring subscription purchase, the website's domain country-code, whether the website's domain listed or flagged as a harmful site in a $3^{rd}$ party service, the website's estimated monthly visitor count, whether the website is present on particular search engines, whether the website is present on particular shopping related search engine, the website's specific search engine ranking for a particular keyword searched, the website's internal ranking or score within a particular search engine, the website's direct competitors, visitor profiles who tend to visit the website, whether the website employs certain remarketing services, whether the website sends particular post-transaction customer service or customer satisfaction emails, whether a visitor was directly referred from a particular business partner site or system, whether the website is a customer in good standing, whether the website has opted in or out of a service or a related service, whether the website has been flagged as ineligible due to volume of disputes or any other factors, whether the website, website owner, and/or website operator have been subjected to identity verification, whether the website received a relevant amount of buyer feedback, positive or negative, whether the website sells restricted merchandise, and/or whether the website employs any other attributes that are related to a particular business partner.

4. The method of claim 1, wherein the detection of an online purchase is made by analyzing one or more of code, data or information from the website.

5. The method of claim 1, further comprising providing the indication when the one or more of the website, website owner and website operator is certified.

6. The method of claim 5, wherein the indication is provided via one or more of in-line, in-line html, embedded within a web page, inserted within a web page, in a toolbar, in a task bar, in a mobile application, in a desktop application, on a TV, on another display device, audibly and via a seal.

7. The method of claim 5, wherein the indication is provided in a search results page or other web page prior to the user visiting a certified website.

8. The method of claim 5, wherein the indication is provided near one or more of the results in a search results page.

9. The method of claim 1, further comprising providing a benefit claim process for a user to utilize a received guarantee.

10. The method of claim 1, further comprising collecting and storing web browsing information.

11. The method of claim 1, further comprising providing a summary of one or more guaranteed shopping transactions to one or more of a user, a certified website, certified website owner and certified website operator and a guaranteed shopping service provider.

12. The method of claim 1, further comprising: providing a user with additional purchase options including one or more of: extended product warranties and product recommendations based on a user's previously guaranteed purchased.

13. The method of claim 1, wherein the indication is provided by a web server.

14. The method of claim 1, wherein the one or more of the website, website owner, website operator, user and entity providing the guarantee are independent of one another.

15. The method of claim 1, wherein the online purchase may include any interaction between user and the website, and wherein the online purchase is a non-financial transaction.

16. A system to analyze an online shopping environment comprising:
  a processor and application that detect a plurality of characteristics associated with one or more of a website, website owner and website operator, the plurality of characteristics used for determining one or more of eligibility and certification, the plurality of characteristics at least including a domain name, a type of SSL certificate, a geographic region and a shopping cart;
  a purchase detection module that detects, using computer code running on a user's device, an online purchase made via a web browser or mobile browser at the website, the detecting comprising using a combination of one or more of a set of predetermined patterns that distinguish a URL of a certified website's completed order page from other URLs on the website, and the detecting further comprising detecting a presence of data elements unique to a specific web page of the certified website; and
  a web server to automatically provide on a portion of the website an indication, the indication representing a presence of a guaranteed shopping technology for an online purchase when the one or more of the website, website owner and website operator associated with the website is certified or eligible to be certified.

17. The system of claim 16, further comprising:
  one or more guaranteed shopping servers that evaluate whether the one or more of the website, website owner and website operator is an acceptable risk, and wherein the guarantee is between two or more of: a user, a third party and the one or more of the website, website owner and website operator, the one or more guaranteed shopping servers automatically provide a third party guarantee when the one or more of the website, website owner and website operator associated with the website is certified or eligible to be certified, and
  the guarantee is provided one or more of before, during and after completion of the online purchase.

18. The system of claim 16, wherein the plurality of characteristics further include one or a combination of the following including: a particular PCI Compliance badge, a particular security scanning service badge, a posted privacy policy, a particular badge signifying membership in an organization or group, display on the website of one or more specific trust badges, a particular review service, a particular social integration, certain ad network content, a certain return on investment tracking services, a particular category of product, a real-time support system, a toll-free telephone number, an SSL certificate from a known trusted provider and/or a particular partner, an age of the website's domain registration, a website's ecommerce provider, a payment method, shipping options, a login capability, loyalty programs or other incentive, a size and/or depth of the website, an estimated number of product SKUs available for purchase on the website, whether the website has a mobile optimized version, whether the website use a Content Delivery Network (CDN), whether the website's transactions are a 1-time purchase or a recurring subscription purchase, the website's domain country-code, whether the website's domain listed or flagged as a harmful site in a $3^{rd}$ party service, the website's estimated monthly visitor count, whether the website is present on particular search engines, whether the website is present on particular shopping related search engine, the website's specific search engine ranking for a particular keyword searched, the website's internal ranking or score within a particular search engine, the website's direct competitors, visitor profiles who tend to visit the website, whether the website employs certain remarketing services, whether the website sends particular post-transaction customer service or customer satisfaction emails, whether a visitor was directly referred from a particular business partner site or system, whether the website is a customer in good standing, whether the website has opted in or out of a service or a related service, whether the website has been flagged as ineligible due to volume of disputes or any other factors, whether the website, website owner, and/or website operator have been subjected to identity verification, whether the website received a relevant amount of buyer feedback, positive or negative, whether the website sells restricted merchandise, and/or whether the website employs any other attributes that are related to a particular business partner.

19. The system of claim 16, wherein the detection of an online purchase is made by analyzing one or more of code, data or information from the website.

20. The system of claim 16, further comprising a display controller that provides the indication when the one or more of the website, website owner and website operator is certified.

* * * * *